United States Patent
Rrahimi

(10) Patent No.: US 8,940,804 B2
(45) Date of Patent: Jan. 27, 2015

(54) ACRYLATE-BASED UV-CURABLE INK, METHOD AND AN INK BASE FOR PRODUCING SAME

(75) Inventor: Migjen Rrahimi, Wetzikon (CH)

(73) Assignee: Pelikan Hardcopy Production AG, Zurich (CH)

( * ) Notice: Subject to any disclaimer, the term of this patent is extended or adjusted under 35 U.S.C. 154(b) by 0 days.

(21) Appl. No.: 13/695,304

(22) PCT Filed: Apr. 29, 2011

(86) PCT No.: PCT/EP2011/056874
§ 371 (c)(1),
(2), (4) Date: Jan. 22, 2013

(87) PCT Pub. No.: WO2011/135089
PCT Pub. Date: Nov. 3, 2011

(65) Prior Publication Data
US 2013/0116358 A1    May 9, 2013

(30) Foreign Application Priority Data
Apr. 30, 2010    (DE) .......................... 10 2010 018 855

(51) Int. Cl.
| G03F 7/031 | (2006.01) |
| C08B 37/00 | (2006.01) |
| C08F 2/50 | (2006.01) |
| C08F 2/46 | (2006.01) |
| B29C 71/04 | (2006.01) |
| A61L 2/08 | (2006.01) |
| A61L 24/00 | (2006.01) |
| C09D 11/30 | (2014.01) |
| C09D 11/101 | (2014.01) |
| C09D 11/322 | (2014.01) |

(52) U.S. Cl.
CPC .............. *C09D 11/30* (2013.01); *C09D 11/101* (2013.01); *C09D 11/322* (2013.01)
USPC .............. 522/8; 522/7; 522/6; 522/1; 522/71; 522/189; 522/184; 520/1

(58) Field of Classification Search
USPC ................. 522/8, 7, 6, 1, 71, 189, 184; 520/1
See application file for complete search history.

(56) References Cited

U.S. PATENT DOCUMENTS

| 2009/0018230 A1 | 1/2009 | Chisholm et al. | |
| 2010/0055407 A1* | 3/2010 | Belelie et al. | 428/172 |
| 2012/0108746 A1* | 5/2012 | Claes | 524/853 |

FOREIGN PATENT DOCUMENTS

| EP | 1 840 176 | * | 1/2007 |
| EP | 1 840 176 A1 | | 10/2007 |
| EP | 2 017 311 | * | 1/2009 |
| EP | 2 017 311 A1 | | 1/2009 |
| EP | 2 053 100 A1 | | 4/2009 |
| EP | 2053100 | * | 4/2009 |
| WO | 2004/106444 | * | 12/2004 |
| WO | 2004/106444 A1 | | 12/2004 |
| WO | WO 2008/035797 | * | 3/2008 |

OTHER PUBLICATIONS

Mitsubishi Chemical, Mitsubishi carbon black, http://www.carbonblack.jp/en/product/list2_01.html.*
PCT/IPEA/409 from PCT/EP2011/056874.

* cited by examiner

*Primary Examiner* — Ling Choi
*Assistant Examiner* — Jessica E Whiteley
(74) *Attorney, Agent, or Firm* — Fay Sharpe LLP; Scott A. McCollister

(57) ABSTRACT

The invention relates to an acrylate-based UV-curable ink, in particular ink jet ink, having a content of pigments, radical photoinitiators, dispersing agent(s) and optionally additional additives, characterized in that said ink contains at least two radical photoinitiators of the Norrish type I and at least one radically curable monomer in the form of a polyfunctional alkoxylated and/or polyalkoxylated acrylate monomer, which comprises one or more diacrylates and/or triacrylates, wherein the mol ratio of all acrylates to all initiators is approximately 5:1 to 19:1. The invention further relates to a method for producing a UV-curable ink, in particular an ink jet ink of the aforementioned type, wherein 1) a ground product or an ink base is produced by grinding one or more radically curable monomers in the form of a polyfunctional alkoxylated and/or polyalkoxylated acryl monomer, which comprise one or more diacrylate(s) and/or triacrylate(s), with one or more pigments and dispersing agents, in particular optionally additionally with synergists, stabilizers and further additives, in a high-performance mill, in particular in a pearl mill, until a constant viscosity and/or constant particle size develops, and 2) the resulting ground product is mixed with further acrylate monomers and the radical photoinitiators in the form of the Norrish type I, and optionally other additives. Said ground product exhibits advantageous physical properties at elevated temperatures and in long-term storage.

19 Claims, 7 Drawing Sheets

ACRYLATE-BASED UV-CURABLE INK, METHOD AND AN INK BASE FOR PRODUCING SAME

The invention relates to an acrylate-based UV-curable ink, especially UV-curable inkjet ink, with a content of pigment(s), radical photoinitiators, dispersing agent(s) and optionally further additives, characterised in that it comprises at least two radical photoinitiators of the Norrish Type I and at least one UV-curable monomer in the form of a polyfunctional alkoxylated and/or polyalkoxylated acrylate monomer, which comprises one or more diacrylates and/or triacrylates, wherein the mol ratio of all the acrylates to all the initiators is approximately 5:1 to 19:1, especially about 7:1 to 15:1.

Various inkjet inks are known in the prior art, such as inkjet inks which are solvent-based, water based or radiation-curable. Solvent-based inkjet inks dry by evaporating a solvent and therefore typically contain a binder, a dye and, as the main component of the constituents of the liquid phase, a liquid with a low boiling point. The solvent may be water, an organic solvent or a mixture of solvents with a low boiling point, such as, for example, described in EP 0 314 403 A1 or EP 0 424 714 A1. Solvent-based inkjet inks have a plurality of drawbacks. On the one hand, many solvents are not environmentally compatible. On the other hand, inkjet inks of this type have to dry before curing in order to achieve a good print result. Moreover, because of the poor wetting properties of many solvents for certain materials, it is often difficult to print, for example, various plastics materials, metals or the like with them.

Radiation-curable inkjet inks are known from EP 0 882 104 B1. Inkjet inks of this type contain 80 to 95% by weight of the total composition in polyfunctional alkoxylated and/or polyfunctional polyalkoxylated acrylate monomer and at least one radical photoinitiator. EP 1 593 521 also relates to a radiation-curable inkjet ink. This contains a radiation-curable oligomer in the form of low-viscosity unsaturated acrylate resins, a radiation-curable acrylate monomer, selected from amongst polyfunctional alkoxylated or polyalkoxylated acrylic monomers, which comprise one or diacrylates or triacrylates, at least one radical photoinitiator and at least one surface-active agent. This inkjet ink has a viscosity of 0.015 Pa·s to 0.008 Pa·s at 40 to 70° C. and a surface tension of $2.0 \times 10^{-4}$ to $3.0 \times 10^{-4}$ N/cm at 40 to 70° C. The ratio of oligomer: monomer is 1:4. The known solvent-free ink jet inks of the prior art require relatively high drying energy of the respectively used UV radiator or UV lamp and/or exhibit low smear resistance with respect to various solvents.

The aim of the present invention is therefore to produce solvent-free inks, especially inkjet inks, with improved properties, especially an ink base for the production thereof, in order to avoid the drawbacks of the prior art. Especially, the invention aims to develop UV-curable inkjet inks, especially UV-curable inkjet inks, which dry using minimum energy on various print media and are smear-resistant after curing with respect to acetone, isopropanol and other solvents. Moreover, an aim of the present invention is to keep the fraction of expensive photoinitiators in the inkjet ink as low as possible. As UV-curable inks of the described type, because of highly reactive UV-initiators in combination with the unsaturated compounds of the functional acrylate groups, tend to premature ageing, it is a special aim of the invention to provide an ink base that is stable in the long term as a basis for inks that are stable in the long term according to the invention, especially inkjet inks, in which the desired physical properties of the ink base, even after a temperature increase to 60° C., do not significantly change over a period of 4 weeks. In this case, at most insignificant changes, especially not more than 20%, preferably not more than 10%, of the originally measured property values occur in the viscosity, the storage modulus and the loss modulus. An ink base of this type should be especially suitable for producing UV-curable ink, especially inkjet ink, which is stable in the long term at room temperature.

According to the invention, the above aim is achieved by an acrylate-based UV-curable ink, especially inkjet ink, having a content of pigment(s), radical photoinitiators, dispersing agent(s) and optionally further additives, characterised in that it contains at least two radical photoinitiators of the Norrish Type I and at least one radically curable monomer in the form of a polyfunctional alkoxylated and/or polyalkoxylated acrylate monomer, which comprises one or more diacrylates and/or triacrylates, wherein the mol ratio of all the acrylates to all the initiators is approximately 5:1 to 19:1, especially about 7:1 to 15:1, or else about 9:1 to 13:1.

Advantageous configurations of the UV-curable ink according to the invention emerge from the sub-claims 2 to 16 and the following description.

A part of the solution to the following invention is furthermore a method for producing the UV-curable ink according to the invention, especially inkjet ink. This method is characterised in that 1. a ground product or an ink base is produced by grinding one or more radically curable monomers in the form of a polyfunctional alkoxylated and/or polyalkoxylated acrylic monomer, which comprise one or more diacrylates and/or triacrylates, pigments and dispersing agents, especially additionally with synergists, stabilisers and further additives, in a high-power mill, especially in a pearl mill, until a constant viscosity and/or constant particle size has developed, and 2. the ground product obtained is mixed with further acrylate monomers and the radical photoinitiators in the form of the Norrish Type I and optionally further additives in accordance with the details according to at least any one of claims 1 to 16.

Advantageous configurations of this method are to be described as follows:

It is advantageous if, additionally, an acrylate oligomer is added in step 1 and/or 2. It is also advantageous if, when carrying out step 1, a maximum temperature of about 60° C. is maintained and/or carbon black is used as a pigment, especially having the following properties: particle size about 20 to 70 nm, especially about 25 to 60 nm, pH≤4 and ≥3 (to ISO 787-9), volatile fraction (to DIN 53552) <5% at 950° C., BET surface (to ASTM D 5816) ≥30 m$^2$/g and ≤90 m$^2$/g.

Moreover, the invention relates to an ink base, especailly in the form of a ground product, which is obtainable according to step 1 of the method according to the invention. This is an advantageous intermediate product for producing the UV-curable ink according to the invention. It is considered to be advantageous in the scope of the invention if, in the designated ground product or the ink base, the content of pigment, such as carbon black, is 10 to 30% by weight, especailly 15 to 25% by weight.

The invention, as can be seen, in its general expression form, relates to any UV-curable inks. However, UV-curable inkjet inks are to be regarded as a preferred configuration here. These are dealt with in detail below. This is not to be restrictive. The statements made there apply equally to those inks, which are not inkjet inks. This is to be expressly noted.

It is important in the practical implementation of the invention, as can be seen, that at least two radical photoinitiators of the Norrish Type I are used. This inevitably leads to the fact that they differ with respect to their absorption maxima These at least two radical photoinitiators are called photoinitiators (A), on the one hand, and photoinitiators (B), on the other hand. The photoinitiator (A) type preferably has a UV absorption maximum in a low wavelength range of the UV range and, during the UV-curing of the colour printout, especially inkjet printout, is especially effective in its surface region, while the radical photoinitiator (B), which has a higher UV absorption maximum, brings about a special curing in the interior of the printout. In this case, the following preferred embodiments are produced:

It is advantageous if the spacing between the absorption maxima of the at least two radical photoinitiators (A) and (B) is at least 20 nm, especially at least 35 nm. If, absorption maxima are mentioned above, these are, especially, to be absorption maxima that occur in the wavelength range of 210 to 400 nm. Many radical photoinitiators of the Norrish Type I and II also have absorption maxima in the range of 200±10 nm, which, however, are to remain disregarded in the sense of the invention. When determining the spacing of the absorption maxima of the radical photoinitiators (A) and (B), which occur in the range from 210 to 400 nm, the relative absorption main maxima are preferably used, i.e. those maxima which have the highest absorption for the respective photoinitiator in the range from 210 to 400 nm.

Considering these preferred details, it is furthermore expedient for the absorption maxima, especially the relative absorption main maximum to be in the range from 210 to 400 nm, that of the radical photoinitiator (A) to be below 290 nm and that of the radical photoinitiator (B), to be above 290 nm. It can also be disclosed as preferred for the absorption maximum of the radical photoinitiator (A) to be between 210 and 280 nm, especially between 230 and 270 nm, and the absorption maximum of the radical photoinitiator (B) to be between 300 and 400 nm, especially between 310 and 370 nm. It is expedient to also pay attention to the mol ratio of the two designated radical photoinitiators (A) and (B). It has been shown that the mol ratio of the radical photoinitiator (A) to the radical photoinitiator (B) is preferably between about 0.7:1 and 1:0.7, especially about 1:1.

The person skilled in the art can see that when selecting the photoinitiators according to the invention, the light emitted by the respective UV-radiators has to be considered. Consequently, in a selected combination of the radical photoinitiator (A) and (B), a UV-radiator is used, which adequately emits light in the absorption range of the respectively selected photoinitiator. In other words, this means that, depending on the combination of the radical photoinitiator (A) and (B), an especially suitable UV-radiator is determined and used. In general, this may be a mercury, iron or thallium lamp. Other conventional commercial UV-radiators familiar to the person skilled in the art may also be used.

The initiators used according to the invention are, especially, UV-initiators, which, in the conventional chemical sense, allow, trigger and/or accelerate UV-initiated reactions of other reactants, especially of the acrylates. The initiators used are preferably those of the Norrish I Type, which disintegrate after an a-splitting into radicals. Examples of such initiators are 2-hydroxy-1-{4-[4-(2-hydroxy-2-methyl-propionyl)-benzyl]-phenyl}-2-methyl-propan-1-one (Irgacure 127), 1-hydroxycyclohexyl-phenyl-ketone (Irgacure 184, Doublecure 184), phenylbis-2,4,6-trimethylbenzoyl-phosphine oxide (Irgacure 819), 2-benzyl-2-dimethylamino-1-(4-morpholino-phenyl)-butanone-1 (Irgacure 369), 2,4,6-trimethylbenzoyl-diphenyl-phosphine oxide (Doublecure TPO, Genocure LTM), 2-dimethylamino-2-(4-methyl-benzyl)-1-(4-morpholin-4-yl-phenyl)-butan-1-one (Irgacure 379), 2-hydroxy-2-methyl-1-phenyl-propan-1-one (Darocur 1173, Genocure DHMA), 2-hydroxy-2-methylpropriophenone (Doublecure 173), 2,2-dimethoxy-2-pheylacetophenone (Irgacure 651) and 2-methyl-1[4-(methylothio)phenyl]-2-morpholinopropan-1-one (Irgacure 907).

At least one of the photoinitiators of the Norrish Type I is preferably selected from 2-hydroxy-1-{4-[4-(2-hydroxy-2-methyl-propionyl)-benzyl]-phenyl}-2-methyl-propan-1-one (Irgacure 127), 1-hydroxycyclohexyl-phenyl-ketone (Irgacure 184), phenylbis 2,4,6-trimethylbenzoyl-phosphine oxide (Irgacure 819), 2-benzyl-2-dimethylamino-1-(4-morpholino-phenyl)-butanone-1 (Irgacure 369), 2,4,6-trimethylbenzoyl-diphenyl-phosphine oxide (Doublecure TPO), 2-dimethylamino-2-(4-methyl-benzyl)-1-(4-morpholin-4-yl-phenyl)-butan-1-one (Irgacure 379). It is especially preferred for at least one of the initiators to be a bifunctional initiator containing two potential splitting points. An example of an initiator of this type is 2-hydroxy-1-{4-[4-(2-hydroxy-2-methyl-propionyl)-benzyl]-phenyl}-2-methyl-propan-1-one (Irgacure 127). Especially rapid drying of the inkjet ink has been exhibited when using one of the following initiator combinations, which are therefore especially preferably used:

1. 2-hydroxy-1-{4-[4-(2-hydroxy-2-methyl-propionyl)-benzyl]-phenyl}-2-methyl-propan-1-one (Irgacure 127)/2-dimethylamino-2-(4-methyl-benzyl)-1-(4-morpho-lin-4-yl-phenyl)-butan-1-one (Irgacure 379), 2. 2-hydroxy-1-{4-[4-(2-hydroxy-2-methyl-propionyl)-benzyl]-phenyl}-2-methyl-propan-1-one (Irgacure 127)/phenylbis-2,4,6-trimethylbenzoyl-phosphine oxide (Irgacure 819), 3. 2-hydroxy-1-{4-[4-(2-hydroxy-2-methyl-propionyl)-benzyl]-phenyl}-2-methyl-propan-1-one (Irgacure 127)/2-benzyl-2-dimethylamino-1-(4-morpholino-phenyl)-butanone-1 (Irgacure 369).

In addition to the initiators already mentioned, auxiliary initiators can also be added, which, with joint use with the initiators already mentioned as preferred, positively assist the curing. Those to be mentioned by way of example in this context are 2-hydroxy-2-methyl-1-phenyl-propan-1-one (Darocur 1173, Doublecure 173 and Genocure DHMA), a mixture of diphenyl-(2,4,6-trimethylbenzoyl)-phosphine oxide and methylbenzoylformate (75/25 Doublecure TPO-L), Trimethylbenzoyldiphenylphosphine oxide (Genocure LTM), and a mixture of 1-hydroxycyclohexylphenylketone and benzophenone (Genocure LEC).

Initiators of the Norrish Type II, which, after activation, start the polymerisation by the H-abstraction mechanism, can also be used in connection with the present invention. If an initiator of this type is additionally used, it may, however, only be used in small quantities of up to 40% by weight, based on the total weight of all the initiators, preferably up to 30% by weight. Examples of initiators of the Norrish Type II are 4,4'-bis(diethylamino)benzophenone (Doublecure EMK), 2-ethylhexyl 4-methylamino-benzoate (Genocure EHA), iso-propylthioxanthone (Genocure ITX), ethyl-4-dimethylaminobenzoate (Genocure EPD) and 4-phenylbenzophenone (Genocure PBZ).

The weight ratio of the sum of all the acrylates, which are described in detail below, to the weight ratio of the sum of all the initiators, is expediently in the range from about 5:1 to 19:1, especially about 7:1 to 15:1, and especially preferably between 9:1 and 13:1, wherein:

$$\Sigma n_{j\ acrylate} = n_{acrylate\ 1} + n_{acrylate\ 2} + \ldots n_{acrylate\ j}$$

$$\Sigma n_{i\ initiator} = n_{initiator\ 1} + n_{initiator\ 2} + \ldots n_{initiator\ i}$$

n=mol in [mmol]

15≥j≥2 10≥i≥2 and at least two initiators of the Norrish Type I.

In the scope of the invention, no especial demands are to be made of the selection of the acrylate monomers. It has proven to be expedient if such radically curable acrylic monomers are used, in which a plurality of acrylate groups are bound to a base molecule. In specialist use, acrylate monomers of this type are also called polyfunctional acrylates. Simple examples of such polyfunctional acrylate monomers are inter alia trimethylol propane triacrylate or dipentaerythritol hexaacrylate. The acrylate monomers also especially preferably have alkylene glycol sub-units or polyalkylene glycol sub-units, by means of which the acrylate radicals are connected to the base molecule. Such acrylate monomers are also called alkoxylated or polyalkoxylated acrylate monomers. Examples of polyfunctional alkoxylated or polyalkoxylated acrylate monomers are ethoxylated trimethylol propane triacrylate (Miramer 3130, Rahn AG), dipropylene glycol diacrylate (Miramer 222, Rahn AG) or bisphenol A 30 Mol ethoxylated dimethacrylate (Miramer 2301, Rahn AG). The base molecule may, on the other hand, consist completely of a polyalkylene glycol, thus, for example, of polyethylene glycol or polypropylene glycol. A simple example of a monomer of this type is polyethylene glycol 400 diacrylate (Miramer 280, Rahn AG).

Apart from the polyfunctional acrylates, monofunctional acrylates can moreover be used, which can also be alkoxylated and/or polyalkoxylated. Simple examples of non-alkoxylated and/or polyalkoxylated acrylate monomers are lauryl acrylate (Miramer 120 from the company Rahn AG) and isodecyl acrylate (Miramer 130 from the company Rahn AG). Examples of an alkoxylated or polyalkoxylated acrylate monomer are ethylene glycol phenyl ether acrylate (Miramer 140, Rahn AG) and ethoxylated nonylphenol acrylate (Miramer M1602, M164 or M166, Rahn AG). A detailed list of the usable acrylate monomers with trade names of the company Rahn AG, with names and structural formulae, will be found below in Annex 1 (list of monomers used).

The ratio of monofunctional to polyfunctional acrylates is not subject to any especial requirements either. It has proven to be expedient for the polyfunctional acrylate to be used at least in a quantity of about 5%, based on the total quantity (according to weight) of acrylates. The ratio of monofunctional acrylates to polyfunctional acrylates is preferably in the range from 95 to 5 to 0.1 to 99.5.

In addition to polyfunctional and monofunctional acrylate monomers, polyfunctional acrylates can be used, in which the acrylate groups are bound to an oligomeric base molecule (backbone), which in turn consists of a sequence of a polymerised monomer repeating n-times. Such acrylates are called "radically curable oligomers" below. Preferred examples of this are polyether acrylates, such as the already mentioned polyethylene glycol 400 diacrylate, but in addition also epoxy(meth)acrylates, polyester(meth)acrylates, urethane(meth)acrylates and acrylated oligoamides. (meth) in this context means that these may both be acrylates and methacrylates as well as mixtures thereof. In the scope of the present invention, especially polyether acrylates are used, especially from the company Rahn AG with the trade name Genomer 3364 and Genomer 3497. When using a radically curable oligomer, about 10 to 100 parts by weight acrylic monomer, especially about 3 to 50 parts by weight, are expediently used for one part by weight of radically curable oligomer.

The dye carriers of the UV-curable inkjet inks according to the invention are, especially, pigments. An imperative constituent is accordingly at least one pigment. In individual cases it may, however, be advantageous to additionally use a dye.

In the present case, special carbon black particles, especially, such as will be described in detail below, are especially suitable for the purposes of the invention. The carbon black particles expediently have at least one of the following properties: a particle size of at least 30 nm, especially preferably 30 to 60 nm an oil adsorption in the range from <100 cc/100 g, preferably ≤60 ml/100 g, and especially preferably ≤50 ml/100 g, a surface to ASTM D5816 of ≤90 $m^2$/g, especially preferably ≤70 $m^2$/g, and especially preferably ≤50 $m^2$/g, a pH of between 3 and 4 and a volatile fraction to 950° C. of ≤5%, preferably ≤2.5%. It has been shown for carbon black particles of this type that the viscosity of the inkjet ink or the ground product produced by the method according to the invention does. not change significantly even with relatively long storage and at a relatively higher temperature. Especially stable inks can be produced with carbon black pigments, which all satisfy the above-mentioned properties. It can be noted quite generally that carbon blacks, which are produced by the furnace black method with controlled oxidation, are especially suitable for a corresponding ground product. Examples of suitable carbon black pigments according to the invention are the pigments Special Black 250, Special Black 350 (marketed by the company Evonik) and Special Black 100.

Apart from carbon black, coloured pigments can also be used, especially those based on quinacridones, isoindolines, isoindolinones, phthalocyanines and benzimidazolones. These pigments expediently have particle sizes of between about 20 and about 150 nm, preferably between about 40 and about 120 nm. The oil adsorption to DIN 53601 is expediently greater than 40 ml/100 g. The surface is preferably more than 25 $m^2$/g (determined to ASTM D5816).

The dispersing agents used according to the invention are used for dispersing the respectively used pigment or pigments in the ground product described later or the finished UV-curable inkjet ink according to the invention. They are also used to reduce the attraction of the individual pigment particles to one another. Especially these are dispersing agents based on long-chain polymers. Examples of dispersing agents, which are especially suitable in the scope of the invention, are Solsperse® 24000, Solsperse® 39000, Solsperse® 35000, Solsperse® 32000, Solsperse® 76400 from the company Lubrizol.

The synergists used according to the invention are used, especially, to increase the interaction between the dispersing agent and the pigment surface and to thus assist the dispersing power of the dispersing agent. Especially, synergists according to the invention are used in the form of Solsperse® 5000, Solsperse® 12000 and Solsperse® 22000 from the company Lubrizol.

The ratio of dispersing agent to synergist is expediently between 10:1 and 2:1, preferably between 8:1 and 5:1.

In the scope of the present invention, stabilisers can also expediently be added to the inkjet ink. These are, especially, long-chain acrylates, which increase the activation energy of the ink base and therefore prevent, for example, premature curing of an UV-activation. The stabiliser to be used especially advantageously in this context is glycerol propoxylate (1PO/OH) triacrylate, which is marketed under the trade name Genorad 16 (company Rahn AG).

Apart from the constituents already mentioned of the UV-curable inkjet inks, additives can also be added, such as are generally used in inkjet inks. Presented as examples of such additives are light stabilisers, which cut out undesired UV-radiation, which can change the appearance of the printed image, thixotropic agents, wetting agents, foaming agents, anti-foaming agents, solvents, waxes, oils, binders, organic and/or inorganic fillers and/or antistatic agents.

In a preferred embodiment of the inkjet ink according to the invention, the content of radically curable oligomer is about 0 to 15%, the content of monofunctional and polyfunctional monomer is about 60 to 85% by weight, the content of pigment is about 3 to 5% by weight, the content of photoinitiator is about 6 to 12% by weight and the total quantity of further additives is about 1 to 8% by weight.

The UV-curable inkjet inks consisting of the above-mentioned components preferably have a viscosity (measured using the Bohlin apparatus at 45° C.) of 5 to 15 mPa·s, especially from 7 to 12 mPa·s and, especially between 10 and 11 mPa·s. Moreover, the UV-curable inkjet inks have a surface tension (ring) between about 20 and 35 mN/mm, especially between 20 and 26 mN/mm.

The UV-curable inkjet ink according to the invention is preferably solvent-free. In individual cases, it may, however, be possible to include up to 10% by weight solvent, preferably less than 5% by weight, and especially less than 1.5% by weight, of a selected solvent. These may, for example, be alcohols, such as ethanol, ketones, such as acetone, esters, such as ethyl acetate, ethers and the like. As a preferred rule, solvents should as far as possible be excluded, as they may reach the environment by evaporation during the inkjet printing.

The UV-curable inkjet ink according to the invention is not restricted to the use of a specific type of radiation. The curing may take place, for example, by electron beams or else by UV-beams. The radical photoinitiator absorbs the radiation energy here, so the polymerisation reaction is initiated. The originally low-viscous composition is then converted to a cured solid mass. As a result, for example, writing or an image is produced, which is distinguished by surprisingly favourable durability, thermal stability and light stability, and is smear-resistant, which is a especial advantage.

Mercury-doped UV lamps with adjustable radiation power may be used as lamps, but alternatively also iron-doped, thallium-doped or otherwise doped vapour discharge lamps.

The starting materials mentioned of the inkjet ink according to the invention are firstly preferably subjected to the method according to the invention. The ground product accordingly obtained in step 1 is an advantageous ink base for the inkjet ink according to the invention. This can be used as a basis for producing the UV-curable inkjet ink according to the invention by adding the radical photoinitiators and optionally further acrylate monomers, as described above.

Especially advantageous configurations of the method according to the invention include:

The time of adding an acrylate oligomer is not decisive. The acrylate monomer can thus be added in step 1 and/or in step 2. In the production of the ground product in step 1, a ratio of dispersing agent to synergist is expediently to be adjusted in such a way that up to about 80 parts by weight synergist, especially about 11 to 26 parts by weight synergist, are allotted to 100 parts by weight of dispersing agent.

The temperature of the ground product during the grinding step is also not restricted in a especial manner, but a maximum temperature of about 60° C., preferably about 50° C., should expediently be maintained during the grinding in step 1. It is furthermore expedient to break off the grinding process in step 1, as soon as an increase in viscosity of the ground product is observed, as this indicates a beginning of polymerisation of the acrylate monomers and/or oligomers. The grinding process may in principle be carried out in different grinding devices. However, it has proven to be advantageous to use a ball mill, especially using zirconium oxide balls, for the grinding process.

The especially advantageous configurations of the ink base according to the invention, especially in the form of the already described ground product, include:

The same constituents as described above for the inkjet ink can be used for the ink base, but with the stipulation that the ink base does not contain any initiators. Especially, the same radically curable acrylate monomers and oligomers, pigments, dispersing agents, synergists, stabilisers and further additives, as described above, can be used. However, the concentration of the pigment in the ground product is significantly higher than in the described inkjet inks: thus, a content of the pigment of between 10 and 30% by weight, preferably between 15 and 25% by weight, is generally used. The content of monomer acrylate in the ink base is expediently between 30 and 70% by weight, preferably between 40 and 65% by weight, and especially preferably between 45 and 55% by weight. If, apart from the monomer acrylate, an oligomer acrylate is also used, its content is expediently between 10 and 30% by weight, preferably between 15 and 25, and especially preferably between 20 and 24% by weight. The content of dispersing agent is preferably between 1 and 10% by weight, especially preferably between 2 and 6% by weight. The quantity of synergist, on the other hand, is preferably between 0.1 and 2% by weight, especially preferably between 0.4 and 1.2% by weight.

The especial advantages of the UV-curable inkjet ink according to the invention can briefly be summarised as follows: The inkjet inks according to the invention are distinguished by the fact that they dry on various printing media at minimal energy and, after curing, are smear-resistant to, for example, acetone, isopropanol and other comparable solvents. In this case, the fraction of expensive photoinitiators can be kept low. They are stable in the long term with the desired physical properties of the ink base not changing significantly at a temperature increase to 60° C. over a period of four weeks. These properties include viscosity, the storage modulus and the loss modulus. The originally measured property values do not change, especially, by more than 20%, and regularly not by more than 10%. An inkjet ink which is UV-curable and stable in the long term at room temperature can be produced using the ink base according to the invention, with the aid of which the inkjet ink according to the invention can be produced.

It has been shown in the storage of the UV-curable ink according to the invention, especially UV-curable inkjet ink, that a storage under oxygen is of great advantage. Oxygen is an inhibitor of polymerisation, resulting in an extension of the storage time of the ink according to the invention. The improved storage-resistance of the UV-curable inks under oxygen is a substantial advantage. It is currently conventional because of the reactivity of similar mixtures, to store them under inert gas, in other words to replace the air from the packaging by, for example, nitrogen, argon or the like. In contrast, in the scope of the present invention, an ink is disclosed, which has dissolved oxygen at a percentage corresponding to a partial pressure adjusted in an atmosphere or in packagings with conventional slight negative/excess pressure (the latter preferred), of above 8% (for example nitrogen+8% oxygen), preferably. .above 21% (for example air) and especially above 60% (for example 60% oxygen and 40% inert gas or air+corresponding $O_2$ addition). Alternatively, a corresponding storage/packaging after production of the ink according to the invention or the correspondingly packaged ink according to the invention could come within the scope recommended here.

The invention is to be described in more detail below with the aid of examples. In this case, various test methods are mentioned, with which it is shown which characterising features of the invention are of especial significance.

EXAMPLE 1

Producing a Curing Mixture and Test Methods

To determine the drying behaviour, different ink bases, in other words acrylate mixtures without the addition of pigment were firstly produced and then different initiator combinations added. These initiator solutions were then dried under UV-light. The tests could thus be carried out more rapidly than with finished inkjet ink mixtures, in which the pigment fractions of the dye(s) adsorb a considerable part of the energy introduced and therefore longer drying times or higher drying energies are necessary. The drying took place with a fusion UV-radiator system UV F300S or LH6 from the company Fusion UV-systems using a mercury-doped lamp with adjustable radiation power. To measure the radiation power at sample level, a UV Power Puck II apparatus from the company EIT Instrument Markets Group was used.

The details of the production and results of the test method and the finished inkjet inks will be discussed by way of example using tables and figures. The individual tables give an overview with respect to:

| Table 1 | the initiators used |
|---|---|
| Table 2 | the acrylate solutions used |
| Table 3 | Test 1 |
| Table 4 | Test 2 |
| Table 5 | Test 3 |
| Table 6 | Test 4 |
| Table 7 | Test 5 |
| Table 8 | Test 6 |
| Table 9 | Test 7 |
| Table 10 | Test 8 |
| Table 11 | Test 9 |
| Table 12 | Test 10 |
| Table 13 | Test 11 |
| Table 14 | Test 12 |

The individual figures show, as follows:

FIG. 1 shows the results for Test 1

FIG. 2 shows an overview of the results of the Tests 1 to 8 according to the invention FIG. 3 shows an overview of the results of the Tests 9 to 12 not according to the invention FIG. 4 shows the required drying energy in finished inkjet inks In total, 26 photoinitiators were tested in various combinations or concentrations. Chemical names and structural formulae of the photoinitiators used and presented under Table 1 under their trade names are given in Annex 2, photoinitiators.

Table 2 gives an overview of the acrylate mixtures 1 to 4 used for the tests. For the chemical name and structure of the acrylates, see above and Annex 1. Analogously to this, acrylate mixtures according to the mixtures disclosed in Table 16 were also tested and found to be suitable under the boundary conditions described in more detail below, especially with respect to the production and use of initiator solution.

As explained in detail in Table 3, a series of different solutions was produced for the Test series 1 by adding two photoinitiators of the Norrish Type I, namely Irgacure 127 and Irgacure 379, in different effective ratios and/or different concentrations, to form a constant base of the acrylate mixture 1 known from Table 2. Each solution was placed on an aluminium foil using a 12 μm doctor blade and irradiated with the UV-lamp until it was touch-dry. The drying energies determined in the process are listed in Table 3 and were shown graphically in FIG. 1. For this purpose, the drying energy was plotted in mJ cm$^{-2}$ against the mol ratio listed on the abscissa of acrylates to UV-initiators.

The procedure was analogous in Tests 2 to 8 (FIG. 2) and the comparative Examples 9 to 12 (FIG. 3). The quantity and type of the acrylate mixture used in each case from Table 2, the quantity and type of the respective photoinitiators, and the acrylate/photoinitiator ratio and the drying energy required for the respective solution are listed for the tests in Tables 4 to 10 and for the comparative tests in Tables 11 to 14.

Surprisingly, it was shown in the preliminary tests, not shown in more detail here, that when using an individual photoinitiator, no satisfactory tests could be achieved. Thus, in tests with only one photoinitiator, it was established that either the printed ink was only cured on the surface or the ink was only cured in the interior, but was still damp on its surface. Only when using a combination of at least two photoinitiators was it possible to achieve results, which allowed a rapid drying even when using small initiator quantities.

The same also applies to acrylate mixtures, according to which a more rapid drying result could only be achieved in a mixture of at least two different acrylates.

Good results, i.e. a rapid drying of the inkjet ink with a use of drying energy, which is less than 200, especially less than 150 mJ cm$^{-2}$, were found here with solutions in a range of an acrylate to initiator ratio of between 7 and 17, especially in a range of between 9 and 15.

On the other hand, a slow drying was observed in the Tests 9 to 12, as can be seen with the aid of the results shown in FIG. 3 for these tests. The drying energies required for these tests are always above 300 mJ cm$^{-2}$, which, in a finished UV-curable inkjet ink, would lead to long drying times.

EXAMPLE 2

Production of UV-Curable Inkjet Inks

Various especially well suited solutions were selected for the production of inkjet inks and mixed by adding a pigment-containing ground product in fractions of between 5 and 20% by weight to the finished inkjet inks. A ground product is preferably used here, which contains acrylates as occur in the respective solution, or at least acrylates, which are compatible with the acrylates used in the solutions, i.e. especially do not react chemically. For example, apart from the acrylate mixtures disclosed in the present Table 2, acrylate mixtures such as the mixtures disclosed in the "inventive application ground product" in Table 2 can also be used.

A selection of the corresponding drying tests with the finished UV-curable inkjet inks is shown in FIG. 4. With the aid of the view of the drying energy relative to the pigment content, in this case carbon black, it can be seen that in the range of a pigment concentration of between 1 and 6% typical of a UV-curable inkjet ink, the drying energy does not rise above 300 mJ cm$^{-2}$ even with a high pigment addition, which corresponds to a very low value.

Especially, the following solutions were used to produce the inkjet inks:

Solution 1.8, solution 3.5, solution 4.5, solution 5.6, solution 7.6, solution 8.5. The respectively used photoinitiators and acrylate mixtures can be inferred from the corresponding Tables 3, 5 to 7, 9 and 10. These solutions all comprise a combination of at least two initiators, which decompose by a-splitting into radicals with UV-activation (Norrish Type I). The mol ratio of the acrylate mixture to the sum of the initiators was adjusted to between 7 and 11.

EXAMPLE 3

Production and Test of the Ground Product

Various ink base dispersions were, in each case, ground in a Dispermat SL-C ball mill using zirconium oxide balls with a diameter between 1.0 and 1.1 mm, without overheating the mixture, therefore below the polymerisation temperature of the acrylates, until the desired degree of homogenising and particle size were adjusted. A mean particle size <200 nm $D_{50}$, especially <150 nm $D_{50}$ is preferably adjusted for this purpose. Adjusting the particle to below <100 nm $D_{50}$ does not produce any further advantages. It is to be noted here that pigment particles in dispersions generally aggregate strongly, so particle sizes in the range of the producer's information are not achieved. Rather, the particle sizes within a ground product are substantially greater than the producer's information, but can be displaced to smaller mean particle sizes by the grinding process.

In order to test the long term stability of the ground product in relation to various physical properties, various test methods for UV-curable inkjet inks were developed. One indicator of a stable ink base is the viscosity and parameters linked with this, which have to remain stable over a relatively long period. The composition is optimised for standard ground product mixtures in such a way that the ground product after the grinding process and dispersion also remains stable after storage for two weeks at a temperature increased to 50° C. (±5% deviation of the physical data). Such tests, do not, however, satisfy the requirements of UV-curable inkjet inks, which are to be storable over an even longer time, for example over one year. Therefore, preparations were mixed using various types of carbon black and different dispersing agents, ground to form the finished ground product and then subjected to a four week long term storage test at a temperature increased to 60° C. The physical data were measured before and after the storage tests to determine the most consistent ground product for stable dispersion.

Oscillation tests: in the tests carried out with a rotational viscometer with ball against plate geometry, non-steady shear conditions were predetermined temporally and evaluated with the software particular to the apparatus. A rheometer from the company Bohlin was used for all the tests.

The following important properties were determined for the printing behaviour in inkjet printing heads:

Storage Modulus G', With the Unit [Pa]

The G'-value is considered a measure of the deformation energy stored during the shear process in the sample material. This energy is completely available after the unloading and acts as a mainspring for the redeformation, which partially or completely compensates the preceding deformation. Substances, which completely store the deformation energy, exhibit completely reversible deformation behaviour; after a loading/unloading cycle, they are present in unchanged form. The elastic behaviour of the measured sample is thus represented by G'.

Loss Modulus G", With the Unit [Pa]

The G"-value is considered a measure of the deformation energy used in the sample material during the shear process and lost thereafter for the measured sample. This energy is consumed during the change in the sample structure and/or given off to the environment, for example when the measured sample partially or completely flows. Flowing and also viscoelastic flowing means: Relative movements occur between the molecules, particles or larger parts, for example "domains" or crystals, of the superstructure; this leads to frictional forces between these components, frictional heat being produced. During this friction process, energy is consumed and this is given off in the form of heat to the environment. Some of this energy may, for example, heat the sample material, and another part is lost, possibly by heating the environment.

Substances, which lose energy during the shear process, exhibit irreversible deformation behaviour; they are present in changed form after a loading/unloading cycle. The viscous behaviour of the measured sample is thus represented by G".

Loss factor or damping factor tan δ with the unit [1]; definition: tan δ=G"/ G'

The loss factor is calculated as a quotient of the lost and the stored deformation energy. It thus gives the ratio between the viscous and the elastic fraction of the viscoelastic deformation behaviour. There always applies:

$$0 \leq \tan \delta \leq \infty \text{ (as } 0° \leq \delta \leq 90°\text{)}$$

Ideal elastic behaviour is expressed by δ=0° wherein tan δ=0, as G' completely dominates over G" here. In ideal viscous behaviour δ=90° wherein tan δ=∞, as G" completely dominates over G' here.

If the viscous and the elastic behaviour are completely in balance (i.e. G'=G"), δ=45° and tan δ=1. Reaching the so-called sol/gel transition point is an important evaluation criterion in gel formation and curing processes.

In Summary There Applies:
In the liquid state ("sol state") there applies: tan δ>1 (as G">G')
In the gel state (solid state) there applies: tan δ<1 (as G'>G")
At the sol/gel transition point there applies: tan δ=1 (as G'=G")

For the tests, a ground product preparation of 500 g was mixed with a mixer (for example dissolver) by mixing the individual positions with the exception of the pigment and synergist for 10 to 20 min. The synergist was then added if necessary while heating for 10 to 40 min and stirred until the solution is homogeneous. The pigment was then added in portions and stirred for a further 20 to 40 min.

To mix the finished inkjet ink, the ground product is presented and the remaining constituents of the inkjet ink added.

EXAMPLES OF THE GROUND PRODUCT OF THE INK BASE (PRODUCTION AND EVALUATION)

The starting mixtures of the components used for the ground product are described below with the aid of the examples in Tables 15 and 16 and FIGS. 5 to 9. The ground product is then subjected to a grinding process, as described above. The physical properties of the carbon black types used are given in Table 14.

The comparative Examples B13 to B41 listed in Table 16 show the problems of poor long term stability of various ground product mixtures of the prior art. Already after storage for two weeks at a temperature of 50° C., a partly extreme increase in the viscosity and certainly too much agglomeration, or a clumping of the solid fractions occurs such that a measurement of the particle size is no longer possible.

Ground product mixtures, which have a dispersing agent to synergist ratio in a preferably narrow range of between 5:1 and 8:1, exhibit excellent long term behaviour. Such mixtures according to the invention are listed in Table 17. However, in principle, comparatively good results could be achieved when adjusting a D/H ratio of between 2:1 and 10:1. In this case, a dispersing agent, namely Solsperse® 3900 and a synergist, namely Solsperse® 5000 were used in each case. All three mixtures exhibit good stability of the physical data for standard storage tests at 50° C. after two weeks, i.e. a deviation of the viscosity of below 10%, and a deviation of the particle size of below 30%. After storage for four weeks at 60° C., a different quality is also exhibited here, however. Thus, in Test B7, the viscosity increased to almost 140% of the original value, which can lead to problems in inkjet printing, whereas the deviations measured in Tests B71 and B261 are negligible with respect to the change to be expected in the print quality. However, it is striking that in Test B261 compared to Test B71, only by the use of a different pigment, namely Special Black instead of Regal 250R, and a dosage of the dispersing agent, which is less by 25%, is a clear improvement in the long term stability of the ground product again possible.

FIGS. 5 to 9 in each case show the course of the parameters described above, storage modulus G' and loss modulus G" in Pascal, tan δ in degrees and viscosity η in Pascal seconds, depending on the frequency. In detail, in the figures:

Figure 5:
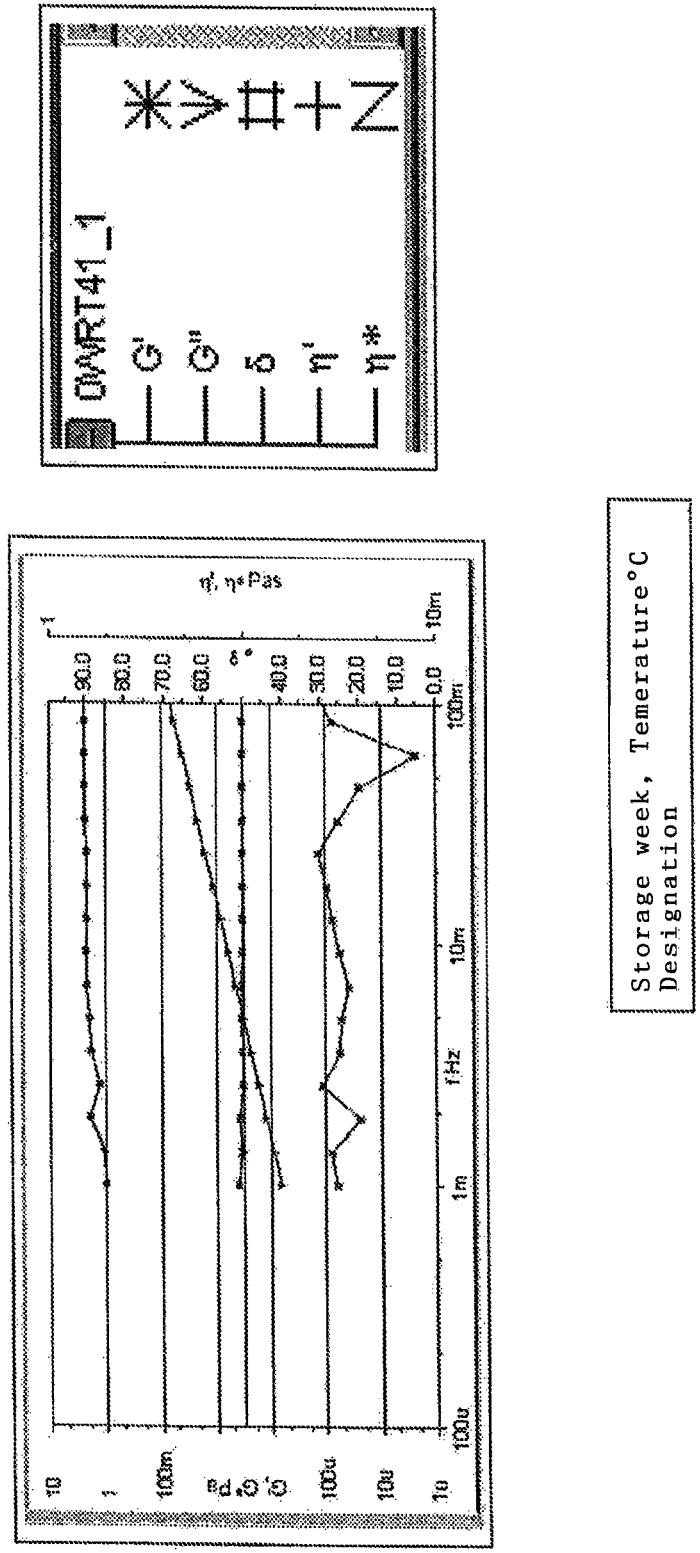
FIG. 5 shows a ground product (B41) not suitable for UV-curable inkjet inks before storage.

FIG. 5 shows, using comparative example B41, a ground product, which, directly after grinding, has properties, which firstly appear usable for use as a ground product for UV-curable inkjet inks. In other words, the storage modulus G' does not fluctuate in the measuring range by more than about 100 µPa, the loss modulus G" exhibits a substantially linear increase from low to high frequency values over the entire measuring range, while the viscosity η' and the complex viscosity η* remain substantially constant over the entire measuring range. Because of the very small loss modulus G' in relation to the storage modulus G", the change in the damping factor δ substantially only depends on the storage modulus.

Figure 6:
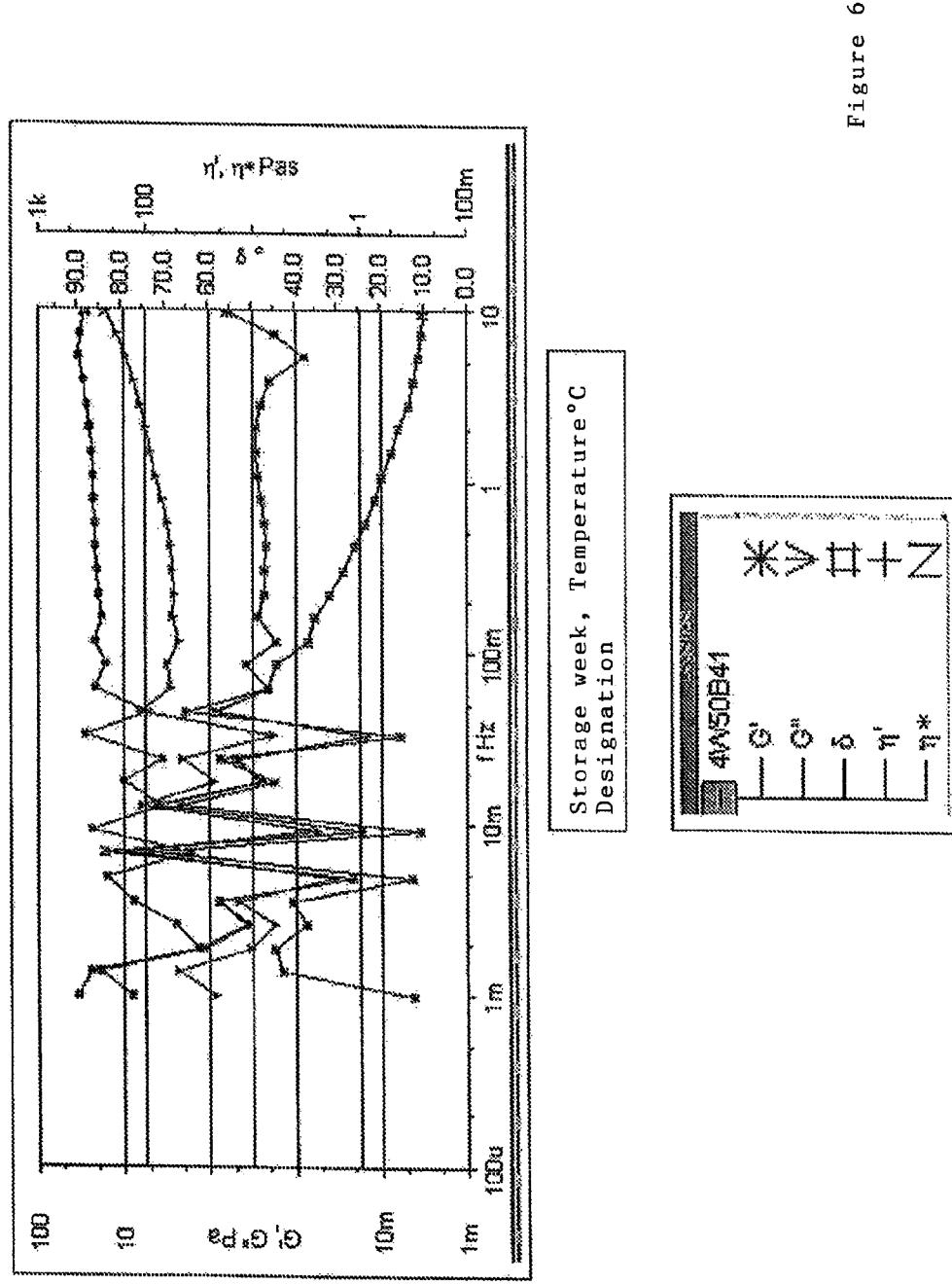
FIG. 6 shows a ground product (B41) not suitable for UV-curable inkjet inks after storage for four weeks.

Using the same comparative example B41, FIG. 6 shows the completely different behaviour of the ground product after storage of 4 weeks under closure at a temperature of 50° C. Because of the greatly fluctuating and partially thixotropic behaviour, this ground product is no longer suitable for UV-curable inkjet inks. The viscosity and δ° are very strongly movement-dependent. In this case, the viscosity of the ground product (green curve) fluctuates at oscillation frequencies below 100 mHz so strongly that a change in the aggregate state occurs, which can be seen by the fluctuation of the curve of the delta value designated #. In this case δ°≈90° signified a purely liquid behaviour, while δ°≈70° already indicates a gel-like behaviour. The storage and loss modulus also exhibit very great fluctuations in the area mentioned.

Figure 7:
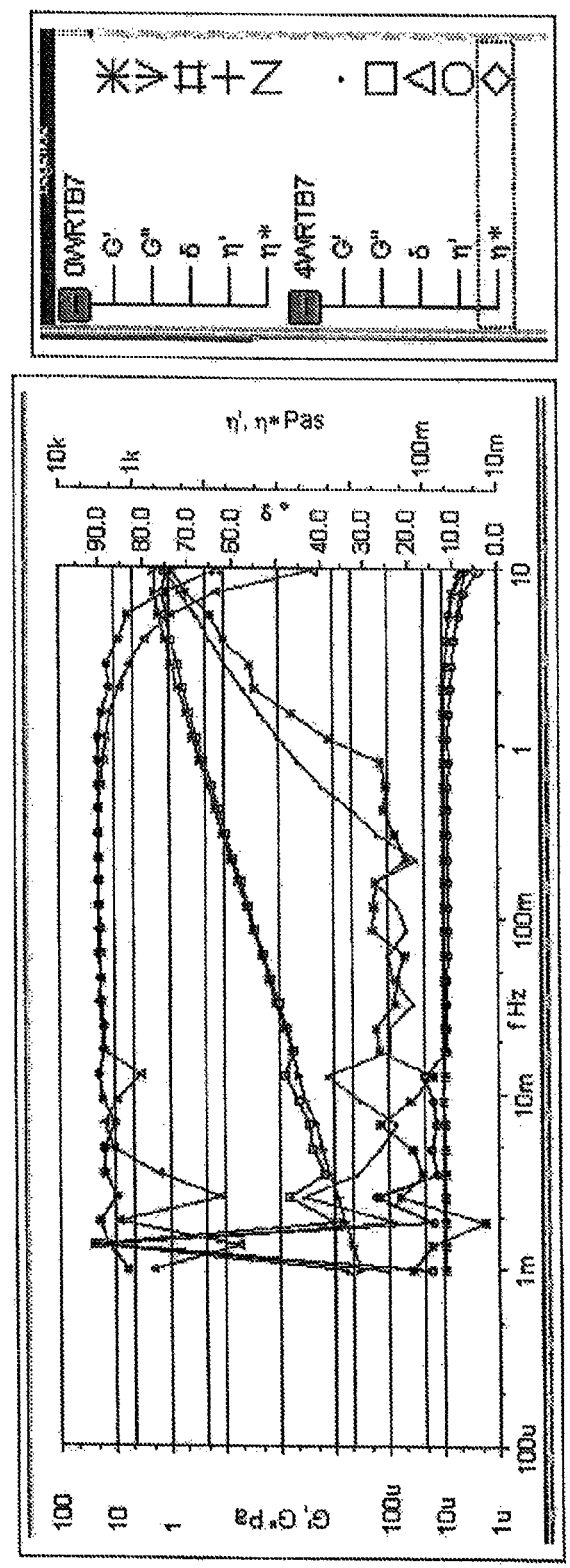
FIG. 7 shows a ground product (B7) only conditionally suitable for UV-curable inkjet inks before and after storage for four weeks.

In contrast, the course of the curve of the ground product B7 shown in FIG. 7 only exhibits small fluctuations in viscosity and delta values after the grinding process. It can only be seen on the course of the curve of the measurement shown in the same graph, after a storage of four weeks at room temperature, that the ground product exhibits a fluctuating behaviour at low frequencies, even if this is less pronounced, of the viscosity and the delta values, which can also impair the stability of the ink.

Figure 8:
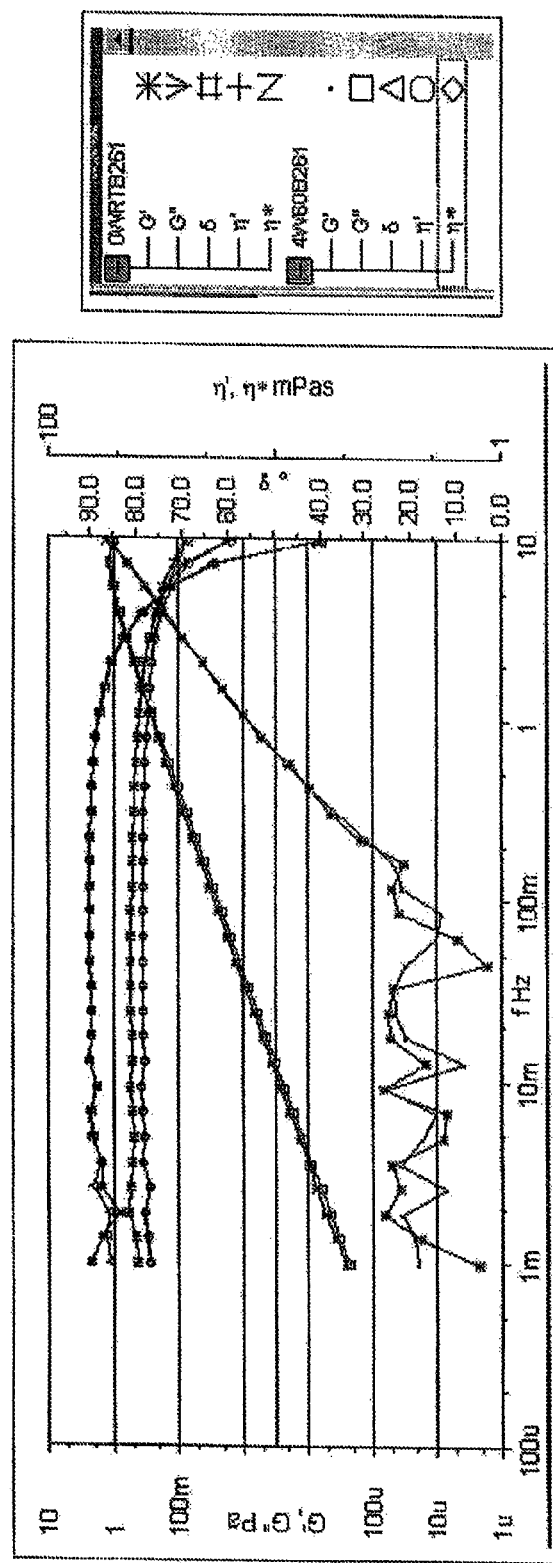
FIG. 8 shows a ground product (B261) suitable for UV-curable inkjet inks before and after storage.

FIG. 8 shows the course of the curve of the ground product B261 suitable for UV-curable inkjet inks after grinding, which is distinguished by substantially constant viscosity and delta values within a broad frequency range. The mixture in this range constantly exhibits the behaviour of a liquid. The course of the ground product after four weeks of storage at 60° C. is also additionally superimposed here on the course of the fresh ground product. Surprisingly, the superimposed curves are virtually identical. This ground product remains very stable for the long term (>one year). Furthermore, the pigment Special Black 250 was used for this test with a coarser mean particle size compared to the carbon black types used in Table B and a correspondingly smaller specific surface, i.e. 46 $m^2/g$ or a smaller oil adsorption capacity, namely 44 ml/g.

Figure 1:
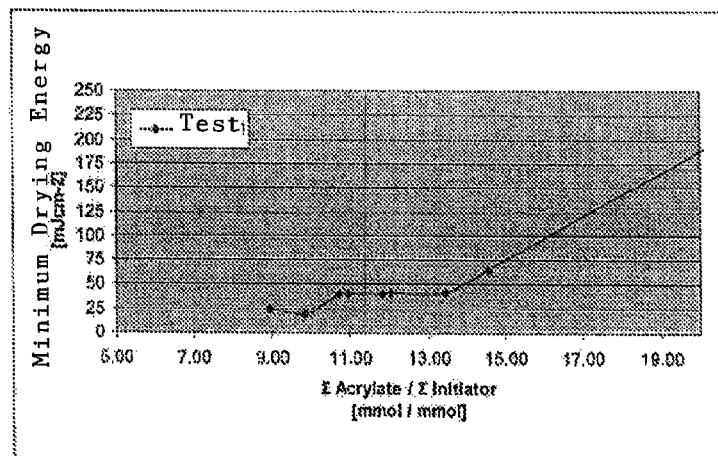
Figure 2:
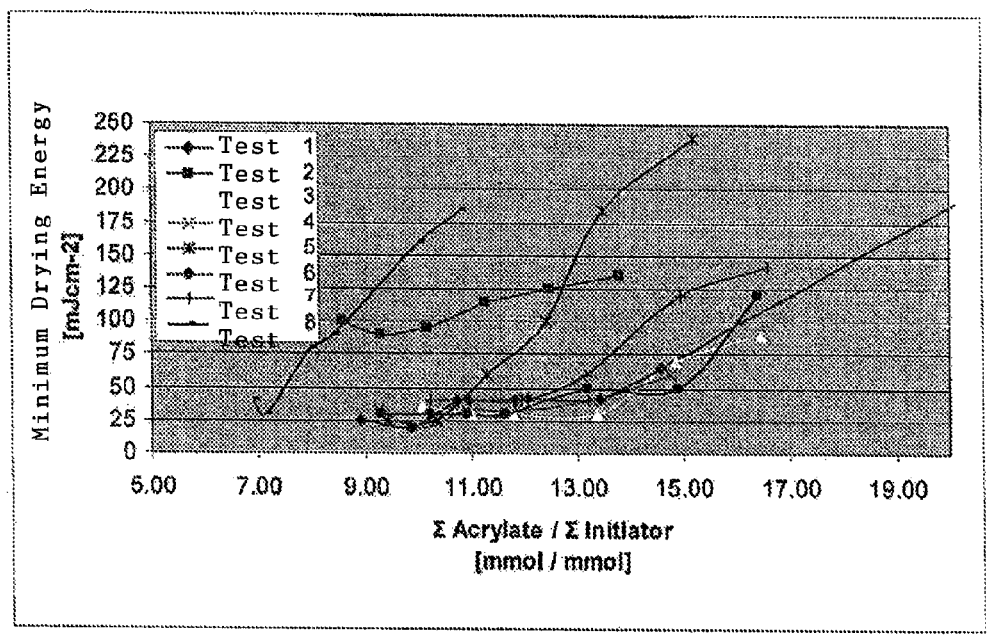
Figure 3:
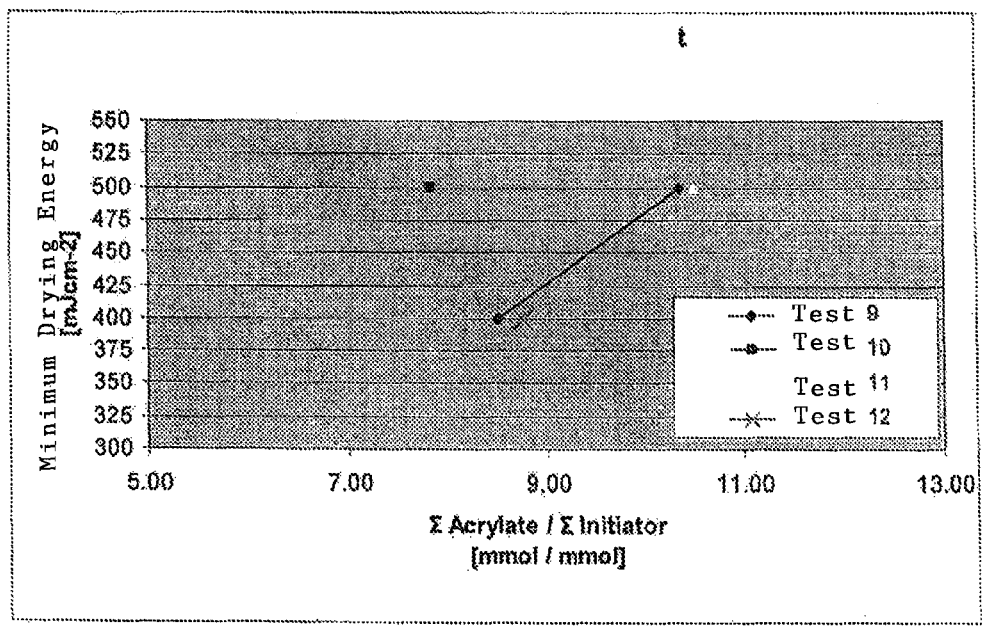
Figure 4:
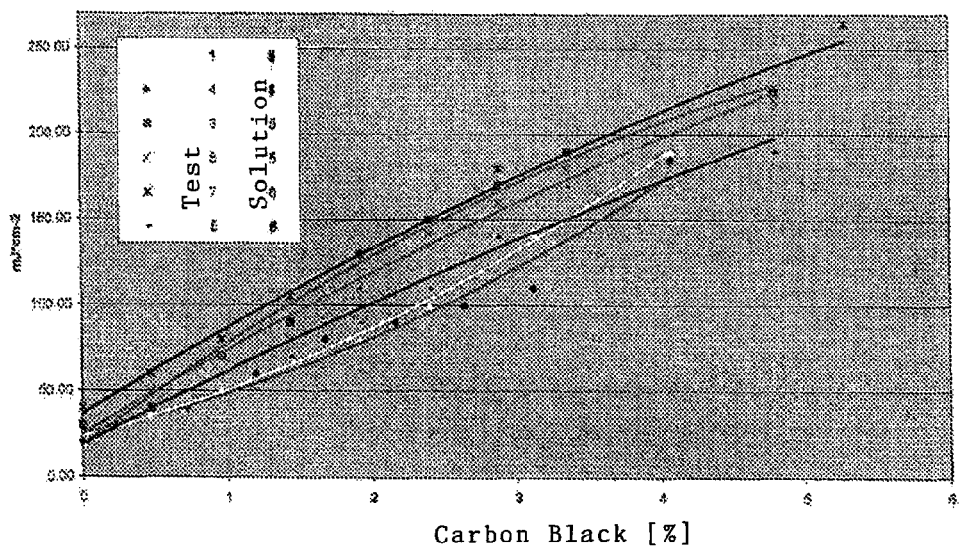
Figure 9:
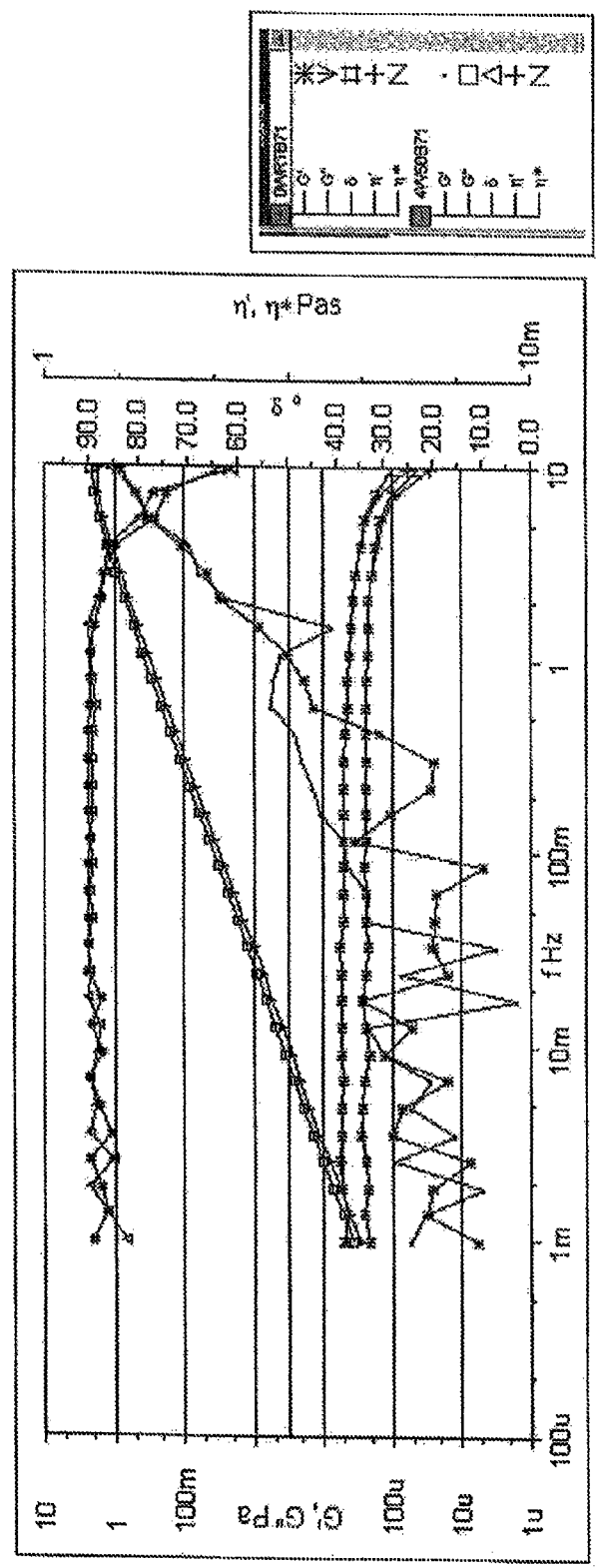
FIG. 9 shows a further ground product (B71) suitable for UV-curable inkjet inks before and after storage.

FIG. 9 shows an analogous superimposition of the curve course of fresh and stored ground product, as in FIGS. 3 and 4, for the ground product B71. This formulation with a fraction of the dispersing agent Solsperse® 39000, which is increased compared to formulation B261 by 33% also shows a long term stable behaviour. The carbon black Regal 250 used here also exhibits similar properties to Special Black 250.

TABLE 1

(Photoinitiators)

| Tested initiators | Company |
|---|---|
| Irgacure 127[1] | Ciba |
| Irgacure 184[1] | Ciba |
| Irgacure 360[1] | Ciba |
| Irgacure 369[1] | Ciba |
| Irgacure 379[1] | Ciba |
| Irgacure 651[1] | Ciba |
| Irgacure 754[1] | Ciba |
| Irgacure 819[1] | Ciba |
| Irgacure 907[1] | Ciba |
| Irgacure 2022[1] | Ciba |
| Irgacure 2100[1] | Ciba |
| Irgacure 2959[1] | Ciba |
| Darocur 1173[1] | Ciba |
| Genocure DMHA[1] | Rahn |
| Genocure CPK[1] | Rahn |
| Genocure EHA[2] | Rahn |
| Genocure EPD[2] | Rahn |
| Genocure ITX[2] | Rahn |
| Genocure LBC[1+2] | Rahn |
| Genocure LTM[1] | Rahn |
| Genocure PBZ[2] | Rahn |
| Genocure TPO[1] | Rahn |
| Doublecure EMK[2] | DBC |
| Doublecure 184[1] | DBC |
| Doublecure 173[1] | DBC |
| Doublecure TPO[1] | DBC |
| Doublecure TPOL[1+2] | DBC |

(Notes:
[1] initiator of the Norrish Type I,
[2] initiator of the Norrish Type II,
[1+2] mixture of initiators of the Norrish Type I and II; designated here are the trade names of the company marketing them (Ciba Geigy and Rahn). Reference is made in this regard to the following Annex 2.)

TABLE 2

(Acrylate mixtures)

| | Molar weight [g/mol] | Mixture 1 [mmol] | Mixture 2 [mmol] | Mixture 3 [mmol] | Mixture 4 [mmol] |
|---|---|---|---|---|---|
| Genorad 16 (stabiliser) | 240 | 0.28 | 0.28 | 0.28 | 0.28 |
| Miramer M222[2] | 242 | | | 84.53 | 77.21 |
| Miramer M216[2] | 328 | 6.81 | 2.71 | | |
| Miramer M120[3] | 240 | 2.78 | 77.22 | 10.2 | |
| Miramer M600[1] | 578 | 0.62 | | | 2.93 |
| Miramer M3130[1] | 428 | | | | 14.80 |
| Miramer M280[2] | 508 | | 6.83 | | |
| Miramer M300[2] | 296 | 76.30 | | | |
| Miramer M2301[2] | 1678 | | 0.58 | | |
| Miramer M100[3] | 344 | | 7.1 | | |
| Miramer M130[4] | 212 | 14.60 | 7.7 | | |
| Miramer M140[4] | 192 | | | 6.81 | |
| Miramer M164[4] | 450 | | | | 0.61 |
| Miramer M166[4] | 626 | | | 0.63 | |
| Miramer M220[2] | 300 | | | | 6.81 |
| Genomer 3364 | unknown | | | | (2 g) |
| Genomer 3497 | unknown | | | (2 g) | |
| Intermediate total in mmol | | 101.39 | 102.42 | 102.52 | 102.64 |

Notes:
[1]polyfunctional acrylate monomer (the first digit gives the functionality)
[2]polyfunctional alkoxylated or polyalkoxylated acrylate monomer (the first digit gives the functionality)
[3]monofunctional acrylate monomer
[4]monofunctional alkoxylated or polyalkoxylated acrylate monomer The acrylates used are shown in Annex 1 in detail with their structural formulae. The Genorad 16 is a stabiliser consisting of two compounds. The corresponding formulae are given below:

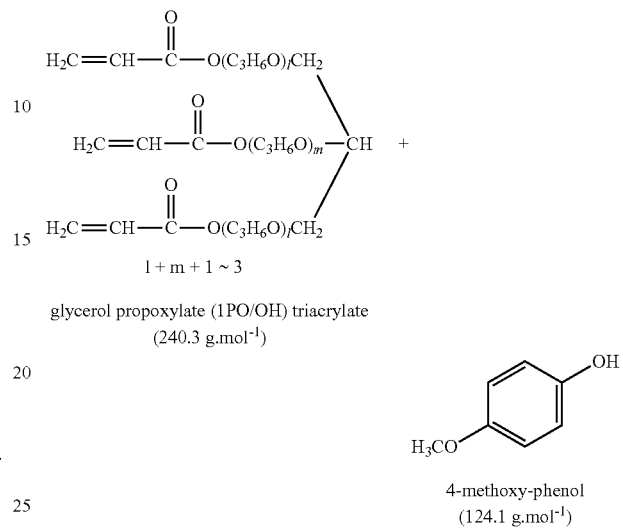

glycerol propoxylate (1PO/OH) triacrylate
(240.3 g.mol$^{-1}$)

4-methoxy-phenol
(124.1 g.mol$^{-1}$)

The Genomers 3364 and 3497 are acrylate oligomers, (no detailed information obtainable from the producer). In this case, Genomer 3364 is a polyether acrylate with three functional groups and Genomer 3497 is a polyether acrylate with four functional groups.

TABLE 3

(Photoinitiators used/ratio of mixture:initiator)

| | Test 1 | | | | | | | | |
|---|---|---|---|---|---|---|---|---|---|
| | Solution 1.1 | Solution 1.2 | Solution 1.3 | Solution 1.4 | Solution 1.5 | Solution 1.6 | Solution 1.7 | Solution 1.8 | Solution 1.9 |
| Irgacure 127 [mmol] | 1.82 | 3.67 | 4.00 | 4.47 | 5.29 | 4.85 | 6.17 | 5.35 | 6.17 |
| Irgacure 379 [mmol] | 1.63 | 3.29 | 3.55 | 3.94 | 3.29 | 4.42 | 3.29 | 4.94 | 5.18 |
| Initiator sum [mmol] | 3.45 | 6.96 | 7.54 | 8.41 | 8.57 | 9.26 | 9.45 | 10.28 | 11.35 |
| Mixture 1 [mmol] | 101.39 | 101.39 | 101.39 | 101.39 | 101.39 | 101.39 | 101.39 | 101.39 | 101.39 |
| Ratio: mixture 1: photoinitiator [mmol:mmol] | 29.38 | 14.57 | 13.44 | 12.06 | 11.83 | 10.95 | 10.72 | 9.86 | 8.94 |
| Minimum drying energy [mJ/cm$^2$] | 400 | 65 | 42 | 42 | 40 | 40 | 40 | 20 | 25 |

TABLE 4

(Photoinitiators used and ratio of mixture:photoinitiator)

| | Test 2 | | | | | |
|---|---|---|---|---|---|---|
| | Solution 2.1 | Solution 2.2 | Solution 2.3 | Solution 2.4 | Solution 2.5 | Solution 2.6 |
| Irgacure 127 [mmol] | 1.54 | 2.44 | 2.60 | 1.87 | 3.24 | 5.79 |
| Doublecure EMK [mmol] | 1.80 | 2.83 | 2.73 | 1.01 | 3.38 | 4.00 |
| Irgacure 379 [mmol] | 1.02 | 1.53 | 1.78 | 1.98 | — | 2.04 |
| Irgacure 2100 [mmol] | 1.08 | 1.33 | 1.89 | 1.92 | — | — |
| Irgacure 184 [mmol] | 1.30 | — | — | 1.88 | 2.08 | — |
| Irgacure 819 [mmol] | 0.60 | — | — | 1.30 | 2.20 | — |
| Initiator sum [mmol] | 7.34 | 8.13 | 9.00 | 9.96 | 10.90 | 11.83 |
| Mixture 1 [mmol] | 101.39 | 101.39 | 101.39 | 101.39 | 101.39 | 101.39 |

TABLE 4-continued (Photoinitiators used and ratio of mixture:photoinitiator)

|  | Test 2 | | | | | |
| --- | --- | --- | --- | --- | --- | --- |
|  | Solution 2.1 | Solution 2.2 | Solution 2.3 | Solution 2.4 | Solution 2.5 | Solution 2.6 |
| Ratio: mixture 1: photoinitiator [mmol:mmol] | 13.81 | 12.48 | 11.26 | 10.18 | 9.30 | 8.57 |
| Minimum drying energy [mJ/cm$^2$] | 135 | 125 | 115 | 95 | 90 | 100 |

TABLE 5

(Photoinitiators used and ratio of mixture:photoinitiator)

|  | Test 3 | | | | | |
| --- | --- | --- | --- | --- | --- | --- |
|  | Solution 3.1 | Solution 3.2 | Solution 3.3 | Solution 3.4 | Solution 3.5 | Solution 3.6 |
| Irgacure 379 [mmol] | 3.26 | 3.60 | 3.97 | 4.57 | 4.86 | 5.23 |
| Irgacure 819 [mmol] | 2.89 | 3.23 | 3.61 | 4.04 | 4.35 | 4.85 |
| Initiator sum [mmol] | 6.15 | 6.83 | 7.58 | 8.61 | 9.21 | 10.08 |
| Mixture 1 [mmol] | 101.39 | 101.39 | 101.39 | 101.39 | 101.39 | 101.39 |
| Ratio: mixture 1: photoinitiator [mmol:mmol] | 16.49 | 14.85 | 13.38 | 11.77 | 11.01 | 10.06 |
| Minimum drying energy [mJ/cm$^2$] | 90 | 70 | 30 | 30 | 30 | 35 |

TABLE 6

(Photoinitiators used and ratio of mixture:photoinitiator)

|  | Test 4 | | | | | |
| --- | --- | --- | --- | --- | --- | --- |
|  | Solution 4.1 | Solution 4.2 | Solution 4.3 | Solution 4.4 | Solution 4.5 | Solution 4.6 |
| Irgacure 127 [mmol] | 3.55 | 3.99 | 4.49 | 4.84 | 5.25 | 5.72 |
| Irgacure 369 [mmol] | 3.38 | 3.71 | 4.17 | 4.52 | 4.93 | 5.32 |
| Initiator sum [mmol] | 6.94 | 7.71 | 8.67 | 9.38 | 10.20 | 11.05 |
| Mixture 2 [mmol] | 102.42 | 102.42 | 102.42 | 102.42 | 102.42 | 102.42 |
| Ratio: mixture 2: photoinitiator [mmol:mmol] | 14.76 | 13.29 | 11.81 | 10.92 | 10.04 | 9.27 |
| Minimum drying energy [mJ/cm$^2$] | 60 | 40 | 33 | 33 | 20 | 33 |

TABLE 7

(Photoinitiators used and ratio of mixture:photoinitiator)

|  | Test 5 | | | | | |
| --- | --- | --- | --- | --- | --- | --- |
|  | Solution 5.1 | Solution 5.2 | Solution 5.3 | Solution 5.4 | Solution 5.5 | Solution 5.6 |
| Irgacure 379 [mmol] | 3.23 | 3.63 | 3.94 | 4.34 | 4.73 | 5.18 |
| Genocure TPO [mmol] | 3.50 | 3.96 | 4.31 | 4.74 | 5.19 | 5.68 |
| Initiator sum [mmol] | 6.73 | 7.59 | 8.25 | 9.07 | 9.92 | 10.86 |
| Mixture 2 [mmol] | 102.42 | 102.42 | 102.42 | 102.42 | 102.42 | 102.42 |
| Ratio: mixture 2: photoinitiator [mmol:mmol] | 15.21 | 13.50 | 12.42 | 11.29 | 10.32 | 9.43 |
| Minimum drying energy [mJ/cm$^2$] | 240 | 185 | 100 | 60 | 25 | 25 |

TABLE 8

(Photoinitiators used and ratio of mixture:photoinitiator)

| | Test 6 | | | | | | |
|---|---|---|---|---|---|---|---|
| | Solution 6.1 | Solution 6.2 | Solution 6.3 | Solution 6.4 | Solution 6.5 | Solution 6.6 | Solution 6.7 |
| Irgacure 369 [mmol] | 3.33 | 3.68 | 4.15 | 4.69 | 5.02 | 5.38 | 5.95 |
| Irgacure 2100 [mmol] | 2.92 | 3.19 | 3.63 | 4.13 | 4.37 | 4.66 | 5.07 |
| Initiator sum [mmol] | 6.24 | 6.88 | 7.78 | 8.83 | 9.39 | 10.03 | 11.01 |
| Mixture 3 [mmol] | 102.52 | 102.52 | 102.52 | 102.52 | 102.52 | 102.52 | 102.52 |
| Ratio: mixture 3: photoinitiator [mmol:mmol] | 16.42 | 14.90 | 13.18 | 11.61 | 10.91 | 10.22 | 9.31 |
| Minimum drying energy [mJ/cm$^2$] | 120 | 50 | 50 | 30 | 30 | 30 | 30 |

TABLE 9

(Photoinitiators used and ratio of mixture:photoinitiator)

| | Test 7 | | | | | |
|---|---|---|---|---|---|---|
| | Solution 7.1 | Solution 7.2 | Solution 7.3 | Solution 7.4 | Solution 7.5 | Solution 7.6 |
| Irgacure 379 [mmol] | 2.03 | 2.38 | 2.03 | 0.89 | 1.19 | 3.23 |
| Irgacure 2100 [mmol] | 1.62 | 2.61 | 1.64 | 0.92 | 0.61 | 2.94 |
| Irgacure 127 [mmol] | 1.2 | 0.85 | 1.2 | 2.34 | 2.04 | |
| Irgacure 184 [mmol] | 1.32 | 0.33 | 1.3 | 2.02 | 2.33 | |
| Initiator sum [mmol] | 6.17 | 6.85 | 7.80 | 8.58 | 9.34 | 10.04 |
| Mixture 3 [mmol] | 102.52 | 102.52 | 102.52 | 102.52 | 102.52 | 102.52 |
| Ratio: mixture 3: photoinitiator [mmol:mmol] | 16.61 | 14.96 | 13.15 | 11.95 | 10.98 | 10.22 |
| Minimum drying energy [mJ/cm$^2$] | 142 | 120 | 60 | 40 | 40 | 40 |

TABLE 10

(Photoinitiators used and ratio of mixture:photoinitiator)

| | Test 8 | | | | | |
|---|---|---|---|---|---|---|
| | Solution 8.1 | Solution 8.2 | Solution 8.3 | Solution 8.4 | Solution 8.5 | Solution 8.6 |
| Irgacure 184 [mmol] | 6.22 | 3.20 | 6.03 | 4.03 | 9.35 | 10.08 |
| Irgacure 369 [mmol] | 1.16 | 3.60 | 2.00 | 4.49 | 4.99 | 4.78 |
| Irgacure 127 [mmol] | 2.10 | 3.41 | 4.15 | 4.34 | — | — |
| Initiator sum [mmol] | 9.48 | 10.21 | 12.18 | 12.86 | 14.34 | 14.86 |
| Mixture 4 [mmol] | 102.64 | 102.64 | 102.64 | 102.64 | 102.64 | 102.64 |
| Ratio: mixture 4: photoinitiator [mmol:mmol] | 10.83 | 10.05 | 8.43 | 7.98 | 7.16 | 6.91 |
| Minimum drying energy [mJ/cm$^2$] | 185 | 160 | 90 | 80 | 30 | 40 |

TABLE 11

(Photoinitiators used and ratio of mixture:photoinitiator)

| | Test 9 | |
|---|---|---|
| | Solution 9.1 | Solution 9.2 |
| Genocure EHA [mmol] | 5.34 | 6.49 |
| Doublecure EMK [mmol] | 4.56 | 5.55 |
| Initiator sum [mmol] | 9.90 | 12.04 |
| Mixture 1 [mmol] | 101.39 | 101.39 |
| Ratio: mixture 1: photoinitiator [mmol:mmol] | 10.34 | 8.51 |
| Minimum drying energy [mJ/cm$^2$] | 500 | 400 |

TABLE 12

(Photoinitiators used and ratio of mixture:photoinitiator)

| | Test 10 Solution 10.1 |
|---|---|
| Genocure 2959 [mmol] | 7.13 |
| Genocure ITX [mmol] | 5.94 |
| Initiator sum [mmol] | 13.07 |
| Mixture 1 [mmol] | 101.39 |
| Ratio: mixture 1:photoinitiator [mmol:mmol] | 7.83 |
| Minimum drying energy [mJ/cm$^2$] | 500 |

TABLE 13

(Photoinitiators used and ratio of mixture:photoinitiator)

| | Test 11 Solution 11.1 |
|---|---|
| Irgacure 2100 [mmol] | 3.73 |
| Genocure ITX [mmol] | 6.02 |
| Initiator sum [mmol] | 9.75 |
| Mixture 1 [mmol] | 101.39 |
| Ratio: mixture 1:photoinitiator [mmol:mmol] | 10.50 |
| Minimum drying energy [mJ/cm$^2$] | 500 |

TABLE 14

(Photoinitiators used and ratio of mixture:photoinitiator)

| | Test 12 Solution 12.1 |
|---|---|
| Irgacure 127 [mmol] | 4.99 |
| Genocure ITX [mmol] | 6.68 |
| Initiator sum [mmol] | 11.67 |
| Mixture 1 [mmol] | 101.39 |
| Ratio: mixture 1:photoinitiator [mmol:mmol] | 8.77 |
| Minimum drying energy [mJ/cm$^2$] | 400 |

TABLE 15

(Properties of the carbon black types used)

| Method | Particle size [nm] | Oil adsorption powd. DBP [cc/100 g] ASTM D2414, DIN 53601 | Surface [m$^2$/g] ASTM D5816 | pH ISO 787-9 | Volatile fraction at 950° C. [%] DIN 53552 |
|---|---|---|---|---|---|
| Carbon black, which stabilises the behaviour in the storage test | | | | | |
| Regal 250 | 34 | 46 | 55 | no details | no details |
| Special black 250 | 56 | 44 | 40 | 3.1 | 2 |
| Special black 350 | 31 | 45 | 65 | 3.5 | 2.2 |
| Special black 100 | 50 | 94 | 30 | 3.3 | 2.2 |
| Carbon black, which impairs the behaviour in the storage test | | | | | |
| Regal 660 | 24 | 65 | 112 | >4 | >2.5 |
| Regal 400 | 25 | 71 | 96 | >4 | >2.5 |
| Regal 330 | 25 | 65 | 94 | >4 | >2.5 |

TABLE 16

(Ground product not suitable for the UV-curable inkjet inks aimed for (viscosity and particle size increase too sharply within two weeks))

| Ground product* | B18 | B19 | B13 | B14 | B14.1 | B14.2 | B381 | B41 |
|---|---|---|---|---|---|---|---|---|
| Inkjet black dispersion | | | | | | | | |
| Monomer acrylate | 53 | 52 | 53 | 52 | 50.5 | 45.5 | 61 | 48.5 |
| Oligomer acrylate | 20 | 20 | 20 | 20 | 20 | 20 | 10 | 20 |
| Stabiliser | 1 | 1 | 1 | 1 | 1 | 1 | 1 | 1 |
| Solsperse 24000 | | | | | | | | 10 |
| Solsperse 39000 | 5.5 | 6.5 | 5.5 | 6.5 | 8 | 13 | | |
| Solsperse 5000 | 0.5 | 0.5 | 0.5 | 0.5 | 0.5 | 0.5 | | 0.5 |
| Disperbyk 2155 | | | | | | | 8 | |
| Regal 660R | | | 20 | 20 | 20 | 20 | 20 | 20 |
| Regal 330R | 20 | 20 | | | | | | |
| Total | 100 | 100 | 100 | 100 | 100 | 100 | 100 | 100 |
| Start | | | | | | | | |
| Particle size [nm] | 122 | 116 | 98 | 100 | 101 | 136 | 120 | 112 |
| Viscosity [mPa · s] | 75.2 | 76.3 | 153.0 | 99.6 | 99.3 | 132.4 | 127.0 | 109.0 |
| After two weeks at 50° C. | | | | | | | | |
| Particle size [nm] | — | — | — | — | — | — | — | — |
| Viscosity [mPa · s] | 440 | 188 | >2000 | >2000 | 149.7 | >2000 | >2000 | >2000 |

*Note:
the ground product was mixed at 50° C. in each case until homogeneity occurred.

TABLE 17

(Ground product** suitable for the UV-curable inkjet inks (both viscosity and particle size remain substantially constant))

| Ground product* | B7 | B71 | B261 | B42 |
|---|---|---|---|---|
| InkJet black dispersion | | | | |
| Monomer acrylate | 54.5 | 54 | 52 | 52 |
| Oligomer acrylate | 21 | 20.5 | 23.5 | 20.5 |
| Genorad 16 | 1 | 1 | 1 | 1 |
| Solsperse 39000 | 3 | 4 | 3 | 5.5 |
| Solsperse 5000 | 0.5 | 0.5 | 0.5 | 1 |
| Regal 250R (cabot) | 20 | 20 | | |
| Special black 250 (Evonik) | | | 20 | |
| Special black 350 (Evonik) | | | | 20 |
| Total | 100 | 100 | 100 | 100 |
| Start | | | | |
| Particle size [nm] | 109 | 108 | 128 | 143 |
| Viscosity [mPa · s] | 44.8 | 44.5 | 37.9 | 50.1 |
| After two weeks at | 50° C. | 50° C. | 60° C. | 50° C. |
| Particle size [nm] | 131 | 138 | 126 | 138 |
| Viscosity [mPa · s] | 42.6 | 44.5 | 36.0 | 52.2 |
| After four weeks at | 50° C. | 50° C. | 60° C. | 60° C. |
| Particle size [nm] | 158 | 109 | 121 | 140 |
| Viscosity [mPa · s] | 101.3 | 53.2 | 35.8 | 52.8 |

Notes:
*the ground product was mixed at 50° C. in each case until homogeneity occurred.
**definition of "suitable" ground product: if the phys. data of a ground product (20% carbon black or pigment content) change less than 15% after two weeks at 50° C., the ground product is suitable for UV-curable inkjet ink.

Annex 1

List of the acrylate monomers used according to the invention (trade name, chemical designation, abbreviation, structural formula)

Miramer 220: tripropylene glycol diacrylate, TPGDA

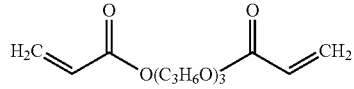

Miramer 600: dipentaerythritol hexaacrylate, DPHA

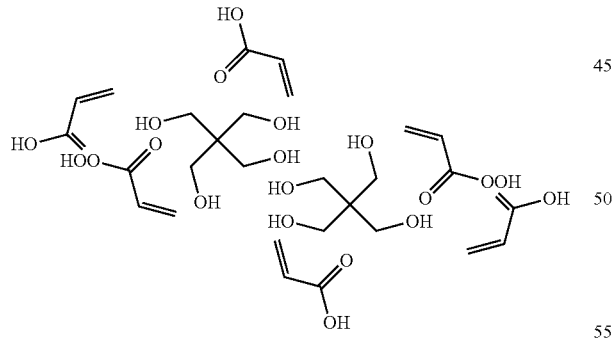

Miramer 120: lauryl acrylate, LA

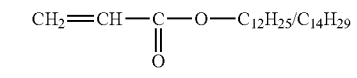

Miramer 216: propoxylated neopentyl glycol, NPG(PO) 2 DA

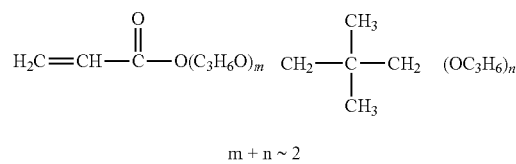

$m + n \sim 2$

Miramer 222: dipropylene glycol diacrylate, DPGDA

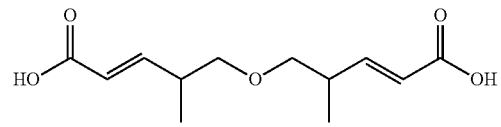 [SMILES: CC(/C=C/C(=O)O)COCC(C)/C=C/C(=O)O]

Miramer 3130: ethoxylated trimethylolpropane triacrylate, TMP(EO) 3 TA

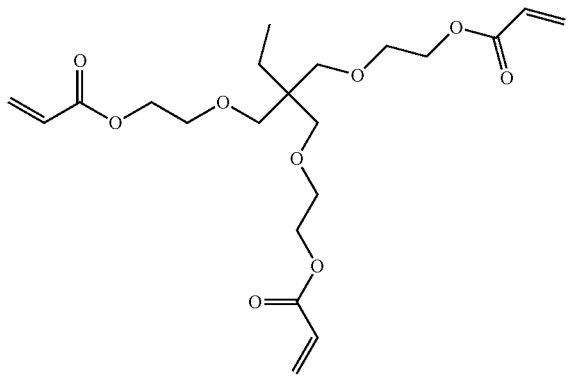 [SMILES: C=CC(=O)OCCOCC(CC)(COCCOC(=O)C=C)COCCOC(=O)C=C]

Miramer 2301: bisphenol A 30 mole ethoxylated dimethacrylate, BPA(EO) 30 DMA

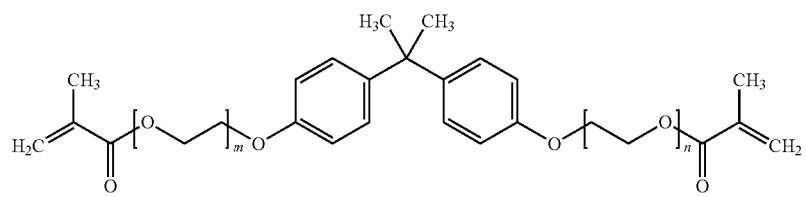

Miramer 300: trimethylolpropane triacrylate, TMPTA

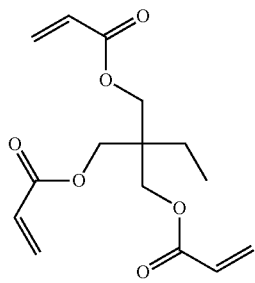 [SMILES: C=CC(=O)OCC(CC)(COC(=O)C=C)COC(=O)C=C]

Miramer 140: ethylene glycol phenyl ether acrylate, PH(EO)A

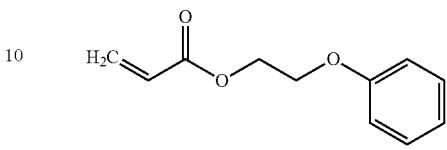

Miramer 280: polyethylene glycol 400 diacrylate, PEG400DA

Miramer 164: ethoxylated nonylphenol acrylate, NP(EO)4A

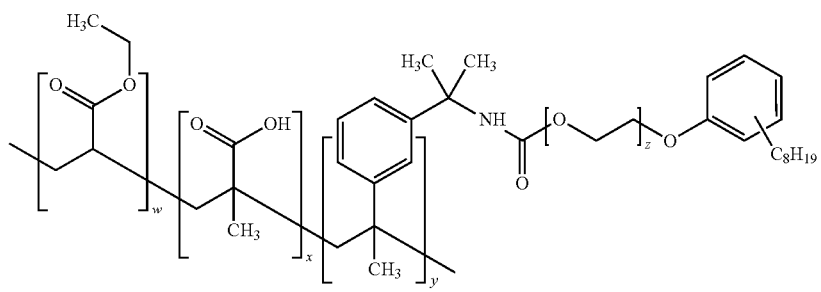

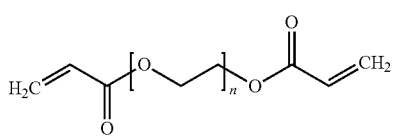

Miramer 130: isodecyl acrylate, IDA

***

Annex 2

Photoinitiators used according to the invention (trade name, structural formula, chemical name)

Irgacure 127:

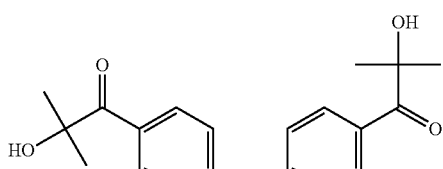

2-hydroxy-1-{4-[4-(2-hydroxy-2-methyl-propionyl)-benzyl]-(phenyl}-2-methyl-propan-1-one
(340.4 g. $mol^{-1}$)

Irgacure 184:

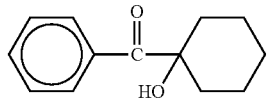

1-hydroxycyclohexyl phenyl ketone (204.3 g. $mol^{-1}$)

-continued

Irgacure 819:

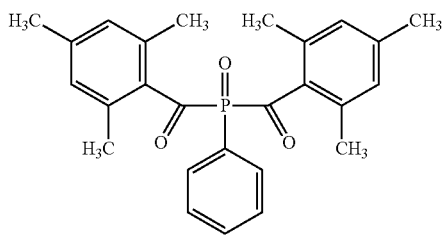

phenylbis 2,4,6-trimethylbenzoyl)
phosphine oxide,
(418.5 g. mol$^{-1}$).
Main component of Irgacure 2002, 360, 2022

Irgacure 369:

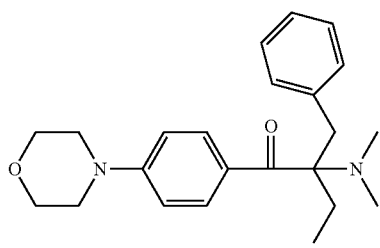

2-benzyl-2-dimethylamino-1-
(4-morpholinophenyl)-butanone-1
(366.5 g. mol$^{-1}$)

Irgacure 651:

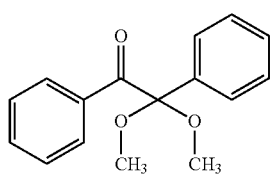

2,2-dimethoxy-2-pheylacetophenone
(256 g. mol$^{-1}$)

Irgacure 907:

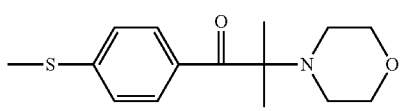

2-methyl-1[4-(methylthio)phenyl]-2-
morpholinopropan-1-one (279.4 g. mol$^{-1}$)

Irgacure 2959:

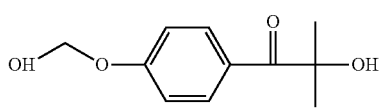

1-[4-(2-hydroxyethoxy)-phenyl]-1-hydroxy-2-
methyl-1-propan-1-one (224.3 g. mol$^{-1}$)

Darocur 1173:

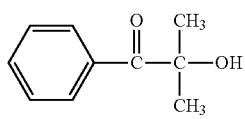

2-hydroxy-2-methyl-1-phenyl-
propan-1-one (164.2 g. mol$^{-1}$)

-continued

Doublecure TPO:

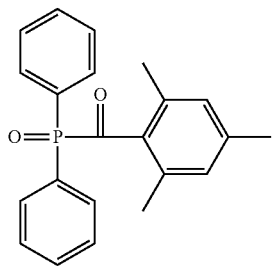

2,4,6-trimethylbenzoyl-dipenyl-
phosphine oxide (348.37 g. mol$^{-1}$)

Genocure DHMA:

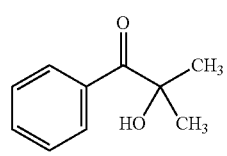

2-hydroxy-2-methyl-1-phenyl-
propanone (164.2 g. mol$^{-1}$)

Genocure EHA:

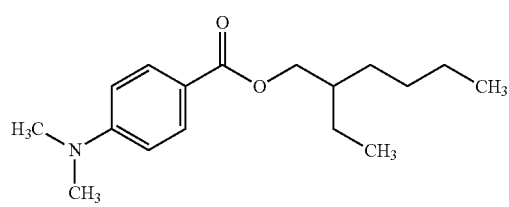

2-ethylhexyl 4-methylamino-benzoate (277.4 g. mol$^{-1}$)

Genocure EPD:

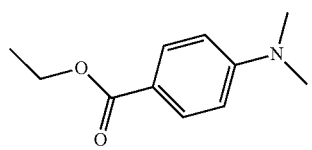

ethyl-4-dimethylaminobenzoate benzoyl-
diphenylphosphine oxide (193.2 g. mol$^{-1}$)

Genocure ITX:

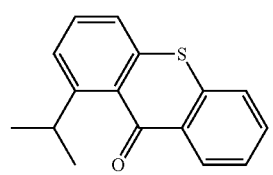

isopropylthioxanthone
(254.3 g. mol$^{-1}$)

-continued

Genocure LTM:

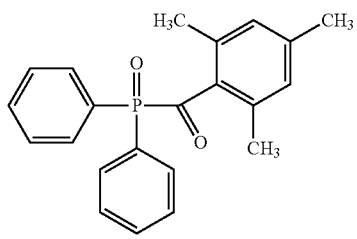

trimethyl (348.4 g. mol$^{-1}$)

Genocure LBC:

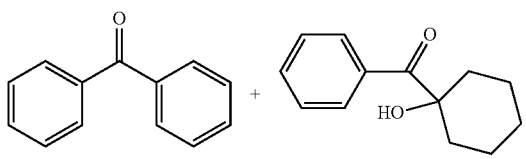

1-hydroxycyclohexyl phenyl ketone + benzophenone
(182.138 g. mol$^{-1}$)

Genocure PBZ:

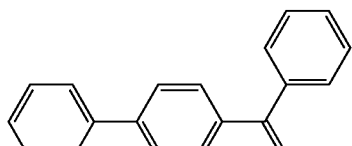

phenylbenzophenone (259 g. mol$^{-1}$)

Irgacure 754:

Mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester Irgacure 379:

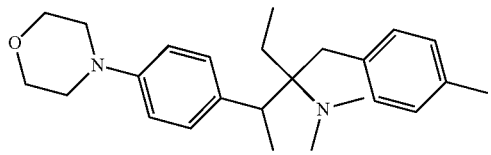

2-dimethylamino 2-(4-methyl-benzyl)-1-(4-morpholin-4-yl-phenyl)-butan-1-one (380.5 g. mol$^{-1}$)

Doublecure EMK:

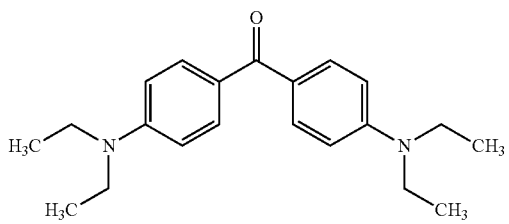

4,4'-bis(diethylamino)benzophenone (324.5 g. mol$^{-1}$)

-continued

Doublecure 173:

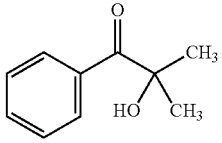

2-hydroxy-2-methylpropiophenone
(164.2 g. mol$^{-1}$)

Doublecure TPO-L:

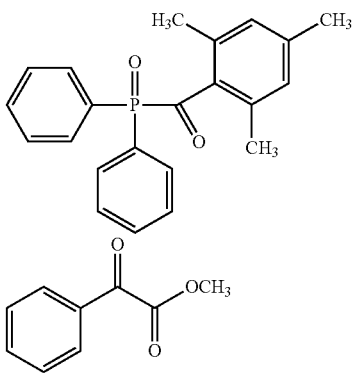

75% diphenyl
(2,4,6-trimethylbenzoyl)
phosphine oxide
(324.5 g. mol$^{-1}$) + 25%
methyl benzoylformate
(164.1 g. mol$^{-1}$)

Doublecure 184:

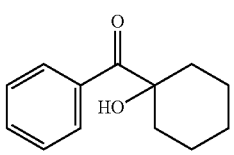

1-hydroxycylohexyl phenyl
ketone (204.26 g. mol$^{-1}$)

The invention claimed:

1. An acrylate-based UV-curable ink having a content of pigment(s), radical photoinitiators, dispersing agent(s) and optionally further additives, characterised in that it contains at least two radical photoinitiators (A) and (B) of the Norrish Type I and at least one radically curable monomer in the form of a polyfunctional alkoxylated and/or polyalkoxylated acrylate monomer, which comprises one or more diacrylates and/or triacrylates, wherein the mol ratio of all the acrylates to all the initiators is from 7:1 to 15:1, and the ink has a viscosity (measured using the Bohlin apparatus at 45° C.) of 5 to 15 mPa.s, and wherein at least one of the radical photoinitiators of the Norrish Type I is a bifunctional initiator comprising two potential cleaving sites or the at least one radically curable monomer comprises more than one di- and/or tri-acrylates.

2. A UV-curable ink according to claim 1, characterised in that the at least two radical photoinitiators (A) and (B) differ with respect to their absorption maxima, wherein especially the spacing between the absorption maxima of the at least two radical photoinitiators (A) and (B) is at least 20 nm.

3. A UV-curable ink according to claim 1, characterised in that the absorption maximum of the radical photoinitiator (A) is below 290 nm and that of the radical photoinitiator (B) is above 290 nm.

4. A UV-curable ink according to claim 1, characterised in that the mol ratio of the radical photoinitiator (A) to the radical photoinitiator (B) is between 0.7:1 and 1:0.7.

5. A UV-curable ink according to claim 1, characterised in that at least one of the photoinitiators of the Norrish Type I is selected from amongst 2-hydroxy-1-{4- [4-(2-hydroxy-2-methyl-propionyl)-benzy ]-phenyl}-2-methyl-propan-1-one, 1-hydroxycyclohexyl-phenyl-ketone, phenyl-bis-2,4,6-trimethylbenzoyl-phosphine oxide, 2 -benzyl-2-dimethylamino-1-(4-morpholino-phenyl)-butanone-1, 2,4,6 -trimethylbenzoyl-diphenyl-phosphine oxide, 2-dimethylamino-2-(4-methyl-benzyl)-1-(4-morpholin-4-yl-phenyl)-butan-1-one.

6. A UV-curable ink according to claim 1, characterised in that a combination is selected from amongst: 1. 2-hydroxy-1-{4-[4-(2-hydroxy-2-methyl-propionyl)-benzyl]-phenyl}-2-methyl-propan-1-one/ 2-dimethylamino-2-(4-methyl-benzyl)-1-(4-morpho-lin- 4-yl-phenyl)-butan- 1 -one, 2.2-hydroxy-1-{4-[4-( 2-hydroxy-2-methyl-propionyl)-benzyl]-phenyl}-2-methyl-propan-1-one/ phenylbis- 2,4,6 -trimethylbenzoyl-phosphine oxide, 3.2-hydroxy-1-{4-[4-(2-hydroxy-2-methyl-propionyl)-benzyl]-phenyl}-2-methyl-propan-1-one/ 2-benzyl-2-dimethylamino-1-( 4-morpholino-phenyl) -butanone-1.

7. A UV-curable ink according to claim 1, characterised in that the polyfunctional alkoxylated and/or polyalkoxylated acrylate monomer is present in the form of tripropylene glycol diacrylate, dipentaerythritol hexaacrylate, propoxylated neopentyl glycol diacrylate, dipropylene glycol diacrylate, ethoxylated trimethylol propane triacrylate, bisphenol A-30 Mol ethoxylated dimethacrylate (BPA(EO) 30 DMA), trimethylolpropane triacrylate, polyethylene glycol 400 -diacrylate and/or ethylene glycol phenyl ether acrylate.

8. A UV-curable ink according to claim 1, characterised in that apart from the polyfunctional alkoxylated and/or polyalkoxylated acrylate monomer, at least one monofunctional alkoxylated and/or polyalkoxylated acrylate monomer and/or a non-alkoxylated and non-polyalkoxylated acrylate monomer is present.

9. A UV-curable ink according to claim 1, characterised in that apart from the radically curable monomer, a low-viscosity radically curable oligomer, especially in the form of a polyester or polyether acrylate, is present.

10. A UV-curable ink according to claim 9, characterised in that about 10 to 100 parts by weight of acrylate monomer are allotted to one part by weight of radically curable oligomer.

11. A UV-curable ink according to claim 1, characterised in that the pigment is present in the form of carbon black, a quinacridone, a benzimidazolone, an isoindolinone and/or a phthalocyanine.

12. A UV-curable ink according to claim 1, characterised in that it has a viscosity (measured using the Bohlin apparatus at 45° C.) of 7 to 12 mPa.s.

13. A UV-curable ink according to claim 1, characterised in that the surface tension (ring) is between about 20 and 35 mN/mm.

14. A UV-curable ink according to claim 1, further comprising dissolved oxygen, the oxygen content being maintained by the oxygen partly pressure of an applied atmosphere.

15. A method for producing the UV-curable inkjet ink according to claim 1, characterised in that
1. a ground product or an ink base is produced by grinding one or more radically curable monomers in the form of a polyfunctional alkoxylated and/or polyalkoxylated acrylic monomer, which comprise one or more diacrylates and/or triacrylates, with one or more pigments and dispersing agents, especially optionally additionally with synergists, stabilisers and further additives, in a high-power mill, especially in a pearl mill, until a constant viscosity and/or constant particle size has developed,
2. the ground product obtained is mixed with further acrylate monomers and the radical photoinitiators in the form of the Norrish Type I.

16. A method according to claim 15, characterised in that the ratio of dispersing agent to synergist is adjusted such that up to about 30 parts by weight dispersing agent are allotted to one part by weight of synergist.

17. A UV-curable ink according to claim 1, characterised in that it contains a carbon black with the following features:
particle size about 30 to 60 nm, pH of between 3 and 4 (to ISO 787 - 9 ), volatile fraction (to DIN 53552 ) <5 % at 950 ° C, BET surface (to ASTM D 5816) of ≤90 m²/g.

18. A UV-curable ink base according to claim 17, characterised in that the value of the oil adsorption (to DIN 536101) of the carbon black is ≤60 ml/ 100 g.

19. An acrylate-based UV-curable ink having a content of pigment(s), radical photoinitiators, dispersing agent(s) and optionally further additives, characterised in that it contains at least two radical photoinitiators (A) and (B) of the Norrish Type I and at least one radically curable monomer in the form of a polyfunctional alkoxylated and/or polyalkoxylated acrylate monomer, which comprises one or more diacrylates and/or triacrylates, wherein the mol ratio of all the acrylates to all the initiators is from 7:1 to 15:1, and the ink has a viscosity (measured using the Bohlin apparatus at 45 ° C.) of 5 to 15 mPa.s, and wherein at least one of the radical photoinitiators of the Norrish Type I is a bifunctional initiator comprising two potential cleaving sites.

* * * * *